(12) United States Patent
Dalton

(10) Patent No.: US 11,922,403 B2
(45) Date of Patent: Mar. 5, 2024

(54) USING AN INTERNAL LEDGER WITH BLOCKCHAIN TRANSACTIONS

(71) Applicant: PayPal, Inc., San Jose, CA (US)

(72) Inventor: Charles Gabriel Neale Dalton, San Jose, CA (US)

(73) Assignee: PayPal, Inc., San Jose, CA (US)

(*) Notice: Subject to any disclaimer, the term of this patent is extended or adjusted under 35 U.S.C. 154(b) by 304 days.

(21) Appl. No.: 17/219,450

(22) Filed: Mar. 31, 2021

(65) Prior Publication Data

US 2022/0318788 A1 Oct. 6, 2022

(51) Int. Cl.
*G06Q 20/38* (2012.01)
*G06Q 20/06* (2012.01)
*G06Q 20/36* (2012.01)
*H04L 9/06* (2006.01)
*H04L 9/00* (2022.01)

(52) U.S. Cl.
CPC ..... *G06Q 20/3674* (2013.01); *G06Q 20/0658* (2013.01); *G06Q 20/3678* (2013.01);
(Continued)

(58) Field of Classification Search
CPC ........... G06Q 20/3674; G06Q 20/0658; G06Q 20/3678; G06Q 20/3829; G06Q 20/065; H04L 9/0643; H04L 9/50; H04L 9/088
See application file for complete search history.

(56) References Cited

U.S. PATENT DOCUMENTS 10,361,853 B2 * 7/2019 Castagna ................... H04L 9/30
11,200,569 B1 * 12/2021 James .................. G06Q 20/381
(Continued)

FOREIGN PATENT DOCUMENTS

WO 2020/104961 A1 5/2020
WO WO-2020104961 A1 * 5/2020
(Continued)

OTHER PUBLICATIONS

International Search Report and Written Opinion in PCT Appl. No. PCT/US2022/071397 dated Aug. 2, 2022, 14 pages.
(Continued)

*Primary Examiner* — Patrick Mcatee
*Assistant Examiner* — Nakia Leffall-Allen
(74) *Attorney, Agent, or Firm* — Kowert, Hood, Munyon, Rankin & Goetzel, P.C.; Dean M. Munyon

(57) ABSTRACT

Systems, methods, and computer-readable media disclosed herein relate to reducing computation and computing resources for certain blockchain related transactions. Specifically, software algorithms and architecture allow some transactions to avoid the need for recordation on a blockchain, which can be computationally expensive both for a requesting device and for various nodes on the blockchain. Thus, a computer system may receive indications of incoming transactions transferring digital assets to particular user accounts, and in response to requests from user accounts, the computer system facilitates one or more internal transactions between those accounts. In response to a request from a particular internal user account, the computer system may perform an outgoing transaction transferring one or more digital assets to an external user account from one or more internal user accounts. The incoming transactions and outgoing transaction are recorded on the blockchain, but the internal transactions are recorded on an internal ledger rather than the blockchain, saving computational power and improving computer operations.

17 Claims, 16 Drawing Sheets

(52) U.S. Cl.
CPC ....... *G06Q 20/3829* (2013.01); *H04L 9/0643* (2013.01); *H04L 9/50* (2022.05)

(56) References Cited

U.S. PATENT DOCUMENTS

| | | | |
|---|---|---|---|
| 11,475,442 B1* | 10/2022 | James | G06Q 20/3829 |
| 11,522,700 B1* | 12/2022 | Auerbach | G06Q 20/3821 |
| 2015/0262171 A1 | 9/2015 | Langschaedel et al. | |
| 2018/0101848 A1* | 4/2018 | Castagna | G06F 9/5016 |
| 2019/0299105 A1 | 10/2019 | Knight et al. | |
| 2019/0303888 A1 | 10/2019 | Hamasni et al. | |
| 2020/0258152 A1 | 8/2020 | Naggar et al. | |
| 2022/0036354 A1 | 2/2022 | Zhang et al. | |
| 2022/0045867 A1 | 2/2022 | Beery et al. | |
| 2022/0076246 A1 | 3/2022 | Griffin et al. | |
| 2022/0122062 A1* | 4/2022 | Mayblum | G06Q 20/381 |

FOREIGN PATENT DOCUMENTS

| | | | | |
|---|---|---|---|---|
| WO | 2020/124199 A1 | 6/2020 | | |
| WO | 2020124199 A1 | 6/2020 | | |
| WO | WO-2020124199 A1 * | 6/2020 | ........... | G06Q 20/065 |

OTHER PUBLICATIONS

Invitation To Pay Additional Fees And, Where Applicable, Protest Fee for Application No. PCT/US2022/071397 dated Jun. 3, 2022, 2 pages.

* cited by examiner

USING AN INTERNAL LEDGER WITH BLOCKCHAIN TRANSACTIONS

BACKGROUND

Technical Field

The present disclosure generally relates to blockchain technology, and hardware and software related thereto. More specifically, the present disclosure relates to systems and methods for reducing computation and computing resources for certain blockchain related transactions.

Description of the Related Art

One problematic aspect of blockchain technology is that transactions on the network may be computationally expensive for both computing nodes on the blockchain, as well as for a requesting computing device that initiated a transaction. These transactions may also have a substantive time delay. Technical improvements related to these issues are described herein.

Figure 1:
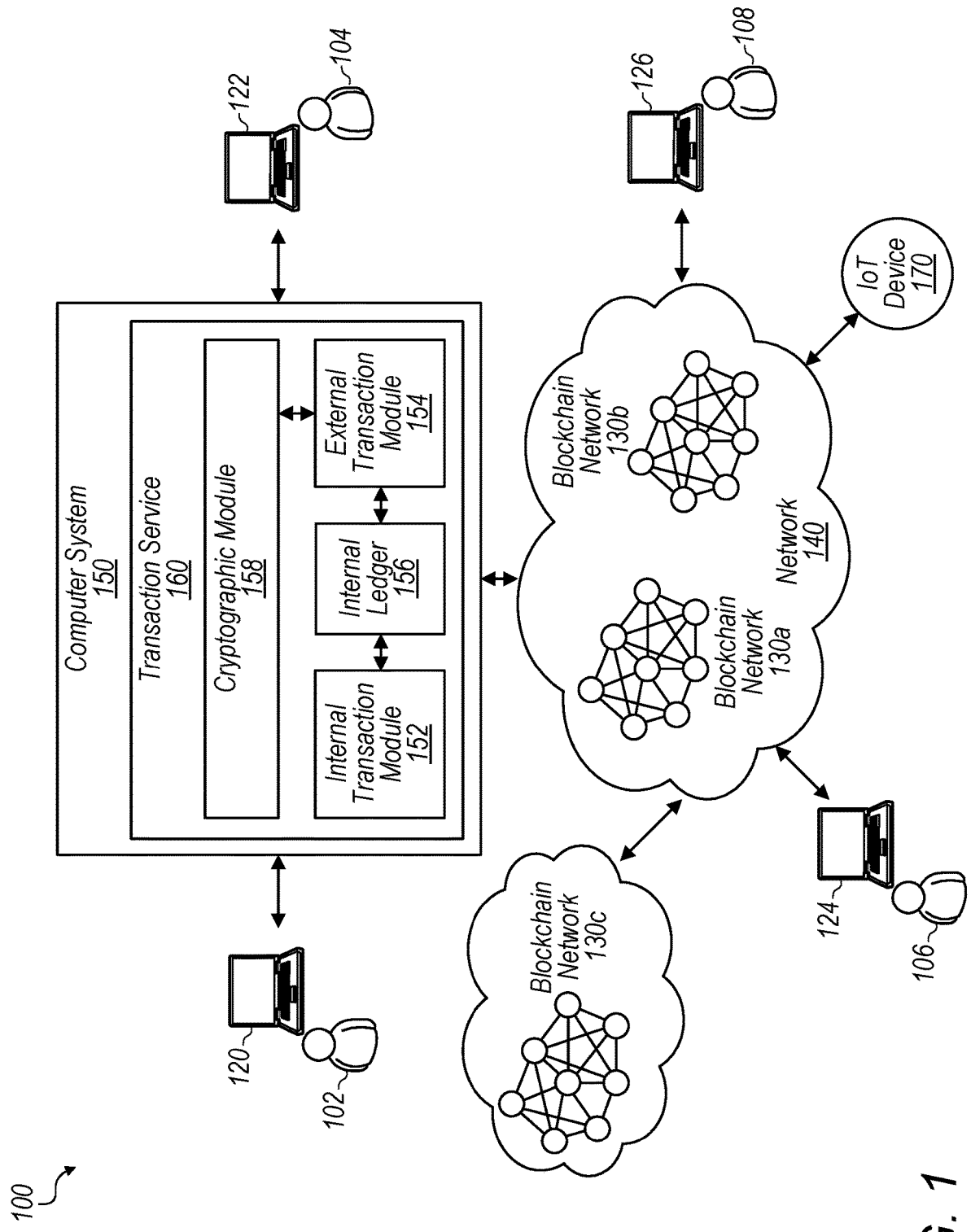
FIG. 1 illustrates an example computing architecture for facilitating one or more blockchain based transactions.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to receive" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" internal transaction would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, a "module" refers to software and/or hardware that is operable to perform a specified set of operations. A module may in some instances refer to a set of software instructions that are executable by a computer system to perform the set of operations. Alternatively, a module may refer to hardware that is configured to perform the set of operations. A hardware module may constitute general-purpose hardware as well as a non-transitory computer-readable medium that stores program instructions, or specialized hardware such as a customized ASIC.

DETAILED DESCRIPTION

In a broad sense, blockchain refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, or Ardor distributed ledger represents each transaction where units of the cryptocurrency are transferred between entities. For example, using a digital currency exchange, a user may buy any value of digital currency or exchange any holdings in digital currencies into worldwide currency or other digital currencies. Each transaction can be verified by the distributed ledger and only verified transactions are added to the ledger. The ledger, along with many aspects of blockchain, may be referred to as "decentralized" in that a central authority is typically not present. Because of this, the accuracy and integrity of the ledger cannot be attacked at a single, central location. Modifying the ledger at all, or a majority of, locations where it is stored is made difficult so as to protect the integrity of the ledger. This is due in large part because individuals associated with the nodes that make up the peer-to-peer network have a vested interest in the accuracy of the ledger.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is assured. For example, a supply chain may be maintained in a blockchain ledger, where the transfer of each component from party to party, and location to location, may be recorded in the ledger for later retrieval. Doing so allows for easier identification of a source for a defective part and where other such defective parts have been delivered. Similarly, food items may be tracked in like manner from farm to grocery store to purchaser.

The distributed ledger proved by a blockchain framework may facilitate a highly-reliable method for tracking transactions between users of the blockchain framework. As discussed in further detail below, however, in various instances the process of publishing a block to the blockchain is computationally expensive (e.g., using processing cycles, computer memory, and network bandwidth) for both the computer system broadcasting the transaction to the blockchain network and the nodes of the blockchain network that maintain the distributed ledger. Thus, if transactions are able to be conducted securely in a way that reduces the number of transactions that are added to the blockchain, computational resources (and financial costs associated with the use of such computational resources) may be saved.

A transaction service may be operable to facilitate transactions between user accounts of the transaction service securely without recording such transactions that are internal to the transaction service if such internal transactions are recorded in an internal ledger. When an internal user account transacts with other users of the blockchain framework, one or more transactions may be written to the blockchain to the harmonize the internal ledger with the distributed ledger. A transaction service might facilitate internal transactions through the use of holding accounts that correspond to the transaction service but not to a particular user of the transaction service. In such an example, when transactions coming into the transaction service transfer ownership of digital assets to a particular user of the transaction service, one or more transactions are written to the blockchain recording a transfer to one or more of the holding accounts and not to the particular user. Similarly, when transactions coming from the transaction service transfer ownership of digital assets from a particular user of the transaction service to another account outside of the transaction service, one or more transactions are written to the blockchain recording a transfer from one or more of the holding accounts to the account outside of the transaction service. In both instances, however, the ownership of the digital asset by the particular user of the transaction service is not recorded on the blockchain. Rather, the blockchain records that one or more holding accounts owned the digital assets.

In various blockchain frameworks, the use of holding accounts is not possible because the blockchain framework requires that transaction for the digital assets be addressed to the particular user and not to a holding account. That is, if a transaction is initiated by a particular user but the destination of the transaction is a holding account that is different from the particular user, such a transaction would be rejected by such blockchain frameworks. For example, a user may want to use their personal account to interact with decentralized applications (dApps). If the service did not support a decentralized application and used a holding account or omnibus model, the user would not be able to interact with it. With each user having an account, however, the user could send an arbitrary message to the decentralized service, which would be signed by the user's private key. Since it is solely the user's account and not a shared account, there would be no security concerns of allowing users to send arbitrary messages (such as one interacting with a dApp) from their account to the blockchain. Additionally, recording the actual owner of a digital asset to the blockchain rather than a holding account improves the auditability and trackability of the ownership of digital assets such that the reliability of the entire blockchain framework may be improved Accordingly, the disclosure herein relates to systems and methods operable to facilitate internal transactions between users of a transaction service that are recorded on an internal ledger such that fewer transactions are recorded on the blockchain (thus saving computational and financial expense) but that enables transactions originating from outside the transaction service to be addressed to an individual user account of the transaction service. As discussed herein, the disclosed techniques enable internal transactions to be tracked using an internal ledger (and that are not recorded on the blockchain) while still allowing individual user accounts of the transaction service to have their own individual cryptographic keys useable to perform transactions with transactions with user accounts that are outside of the transaction service that are recorded on the blockchain. Additionally, in various instances, because various embodiments of blockchain frameworks allow transactions to include multiple sources, depending on the history of internal transactions recorded on the internal ledger, the disclosed techniques may allow for outgoing transactions to be consolidated such that fewer outgoing transactions are broadcast for recording on the blockchain.

In various blockchain frameworks, the use of holding accounts is not possible because the blockchain framework requires that transaction for the digital assets be addressed to the particular user and not to a holding account. That is, if a transaction is initiated by a particular user but the destination of the transaction is a holding account that is different from the particular user, such a transaction would be rejected by such blockchain frameworks. Additionally, by recording ownership Implementations of the present disclosure will now be described in detail with reference to the accompanying Figures.

Computing Architecture

As discussed above, the distributed ledger in a blockchain framework is stored, maintained, and updated in a peer-to-peer network. In one example the distributed ledger maintains a number of blockchain transactions. FIG. 1 shows an example system 100 for facilitating blockchain transactions that are recorded on the blockchain and/or an internal ledger. The system 100 includes a first external client device 124, a second external client device 126, a computer system 150, a first internal client device 120, a second internal client device 122, and an Internet of Things (IoT) device 170 interconnected via a network 140. The first internal client device 120, a second internal client device 122, first external client device 124, the second external client device 126, the computer system 150 may be a computing device 1400 described in more detail with reference to FIG. 14. The IoT device 170 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices along with connectivity hardware configured to connect and exchange data.

The network 140 may be any of a variety of available networks, such as the Internet, and represents a worldwide collection of networks and gateways to support communications between devices connected to the network 140. The system 100 may also comprise one or more distributed or peer-to-peer (P2P) networks, such as a first, second, and third blockchain network 130a-c (generally referred to as blockchain networks 130). As shown in FIG. 1, the network 140 may comprise the first and second blockchain networks 130a and 130b. The third blockchain network 130c may be associated with a private blockchain as described below with reference to FIG. 2, and is thus, shown separately from the first and second blockchain networks 130a and 103b. Each blockchain network 130 may comprise a plurality of interconnected devices (or nodes) as described in more detail with reference to FIG. 2. As discussed above, a ledger, or blockchain, is a distributed database for maintaining a growing list of records comprising any type of information. A blockchain, as described in more detail with reference to FIG. 3, may be stored at least at multiple nodes (or devices) of the one or more blockchain networks 130.

In various embodiments, computer system 150 provides a transaction service 160. Transaction service 160 is operable to facilitate transactions between the entities by utilizing a blockchain associated with one of the blockchain networks 130. In various embodiments, transaction service 160 includes an internal transaction module 152, an external transaction module 154, an internal ledger 156, and a cryptographic module 158. Internal transaction module 152 is operable to facilitate internal transactions between internal user accounts and external transaction module 154 is operable to facilitate incoming and outgoing external transactions between internal user accounts and external user accounts. In various instances, the results of internal transactions are recorded using internal ledger 156. In various instances, transactions broadcast from computer system 150 to blockchain networks 130 are based in part on the record of internal transactions recoded in internal ledger 156. Additionally, in various embodiments, transaction broadcast from computer system 150 to blockchain networks 130 include one or more cryptographic indicators generated by cryptographic module 158. As discussed herein, in various embodiments cryptographic module 158 is operable to access cryptographic keys corresponding to the internal user account and that are useable to record outgoing external transaction with blockchain networks 130 (e.g., a private cryptographic key corresponding to first internal user 102 that is usable to cause transactions from first internal user 102 to an external user to be recorded with blockchain networks 130.). Similarly, such cryptographic keys are also able to be used to allow an individual internal user to be the receiver of an incoming external transaction (e.g., a public cryptographic key corresponding to first internal user 102 that is usable by external user accounts on blockchain networks 130 to indicate first internal user 102 as the receiver of an incoming external transaction). The various components of computer system 150 are discussed in additional detail in reference for FIGS. 6, 7A, 7B, 8, and 9.

Computer system 150 communicates with "internal" client devices (e.g., first internal client device 120, a second internal client device 122) and "internal" users (e.g., first internal user 102, second internal user 104) to facilitate transactions. In various embodiments, any number of internal client devices may be operable to facilitate transactions between any number of internal users (e.g., thousands, millions). As used herein, an "internal" client device refers to a client device that accesses the blockchain networks 130 through transaction service 160. Similarly, an "internal" user refers to a user that accesses the blockchain networks 130 through transaction service 160 via an internal client device. Conversely, "external" client devices and "external" users do not access the blockchain networks 130 through transaction service 160 (although in some embodiments where transaction service 160 facilitates transactions between external users, such external client devices may send transactions to transaction service 160 that transaction service 160 broadcasts to the blockchain networks 130 as discussed herein). In various embodiments, transaction service 160 has access to the private cryptographic keys of "internal" user accounts but does not have access to the private cryptographic keys of "external" user accounts. In various embodiments, because transaction service 160 retains the cryptographic keys used to facilitate transactions that are recorded with the blockchain networks 130, internal users are only able to access the blockchain networks 130 through transaction service 160. In other embodiments, however, internal users may have access to the cryptographic keys corresponding to their account and access the blockchain networks 130 without going through transaction service 160.

The example shown in FIG. 1 includes four entities: first internal user 102, second internal user 104, first external user 106, and second external user 108 (although any number of entities may interact perform transactions on blockchain networks 130 as internal users or external users). In one example, a blockchain based transaction may generally involve a transfer of data or value between entities, such as the first external user 106 of the first external client device 124 and the first internal user 102 of the first internal device 120 in FIG. 1. In the embodiments discussed herein, the various entities are represented in blockchain networks 130 with respective user accounts. In various embodiments, user accounts are identified within the blockchain networks 130 by one or more identifiers. In some of such embodiments, such identifiers include cryptographic indicators such as a public key derived from a private key. As discussed herein, such a private key may be securely stored, for example, on a client device (e.g., first external client device 124) and/or on computer system 150 (e.g., by cryptographic module 158).

In various instances, entities can use the blockchain networks 130 to conduct transactions with each other. Such transactions include transactions between external users, transactions between internal users, and transaction between internal users and external users. As used herein, an "internal transaction" refers to a transaction between two or more internal users (e.g., a transaction in which first internal user 102 transfers ownership of a digital asset to second internal user 104). In various embodiments, such internal transactions are performed using internal transaction module 152 and recorded on internal ledger 156. As used herein, "incoming external transaction" and "incoming transaction" refer to transactions between one or more external users and one or more internal users in which the one or more external users is transferring ownership of a digital asset to the one or more internal users (e.g., a transaction in which first external user 106 transfers ownership of a digital asset to second internal user 104). The transaction is "incoming" in that ownership of a digital asset is being transferred to an internal user of the transaction service 160 from one or more external users. As discussed herein, such incoming external transactions are recorded on the blockchain. In various embodiments, computer system 150 monitors for such incoming transactions using external transaction module 154. Similarly, as used herein, "outgoing external transaction" and "outgoing transaction" refer to transactions between one or more external users and one or more internal users in which the one or more internal users is transferring ownership of a digital asset to the one or more external users (e.g., a transaction in which first internal user 102 transfers ownership of a digital asset to second external user 108). Thus, the transaction is "outgoing" in that ownership of a digital asset is being transferred from an internal user of transaction service 160 to one or more external users. In various embodiments, outgoing external transaction are performed using external transaction module 154 (in some embodiments using internal ledger 156) and recorded by broadcasting the transaction to blockchain networks 130 for recording. Additionally, in various embodiments, external users may use transaction service 160 to transfer ownership of digital assets between one another.

In various embodiments, internal transactions are not broadcast to blockchain networks 140 but instead are recorded on an internal ledger. For example, the first internal user 102 may request or initiate a transaction with the second external user 108 via a user application executing on the first external client device 120. The transaction may be related to a transfer of value or data from the first internal user 102 to the second external user 108. The first internal client device 120 may send a request of the transaction to the computer system 150. In various embodiments, transactions sent from computer system 150 to the blockchain networks 130 are generated based on the record of internal transactions recorded in internal ledger 156. In various instances based on internal ledger 156, the transaction submitted by computer system 150 after being requested by a particular internal user (e.g., first internal user 102) to a recipient external user (e.g., second external user 108) may include an indicator of a transfer from a different internal user (e.g., second internal user 104) to the recipient external user. In such instances, results of internal transactions recorded on internal ledger 156 is reconciled with the record on the distributed ledger maintained on blockchain networks 130.

Accordingly, computer system 150 is operable to reduce the number of transactions that are recorded on the blockchain by recording internal transactions on internal ledger 156 and not with blockchain networks 130. Additionally, by allowing internal users accounts to have individual cryptographic indicators, computer system 105 is operable to (a) facilitate incoming external transactions transferring ownership of a digital asset to a particular internal user that is specifically identified in a transaction recorded with blockchain networks 130 and (b) broadcast transactions to blockchain networks 130 to record outgoing external transaction from a particular internal user to an external user. As discussed in further detail herein, such outgoing external transactions may be used to reconcile results of internal transactions recorded in internal ledger 156.

Blockchain Network

Figure 2:
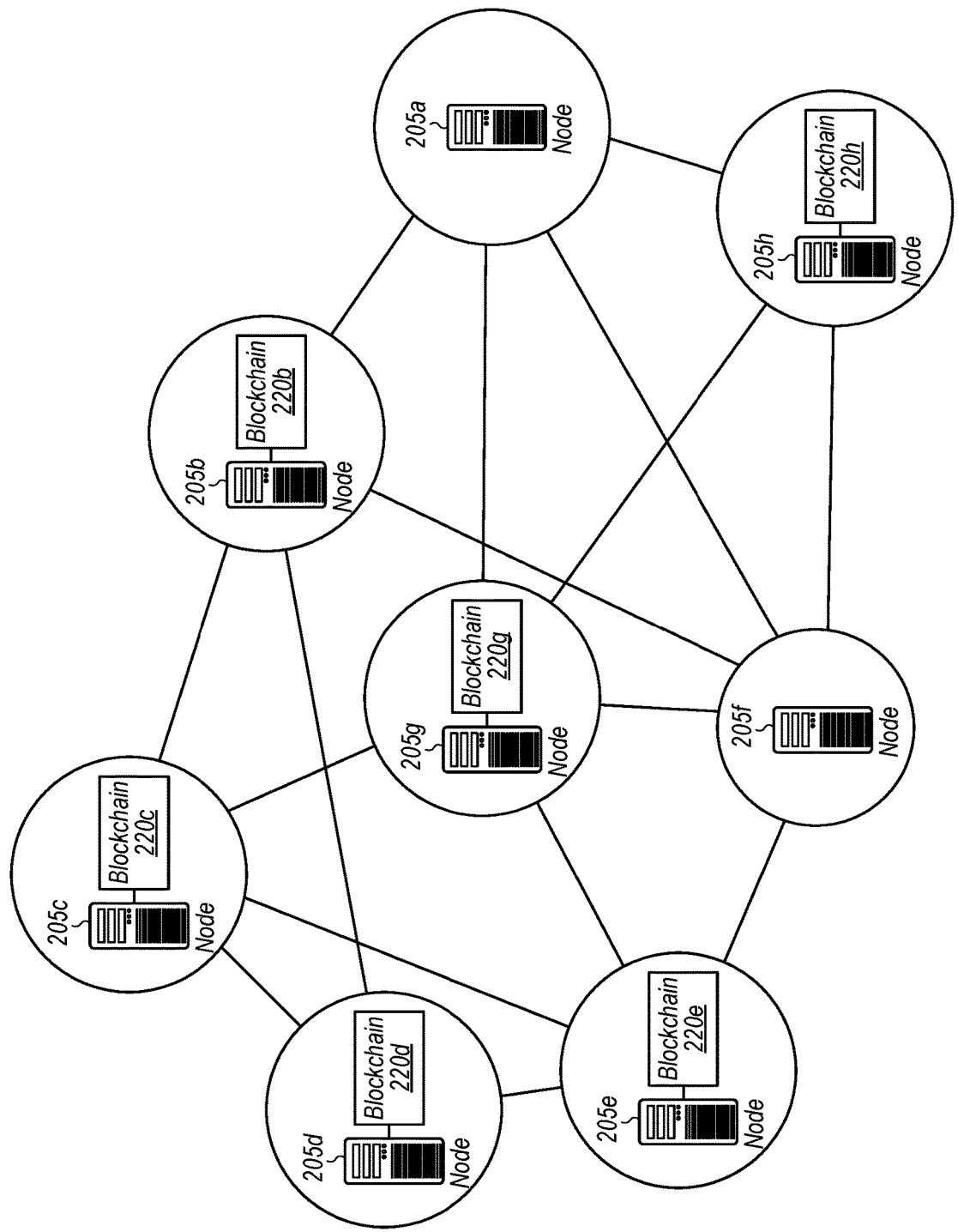
FIG. 2 illustrates an example blockchain network.
Figure 3:
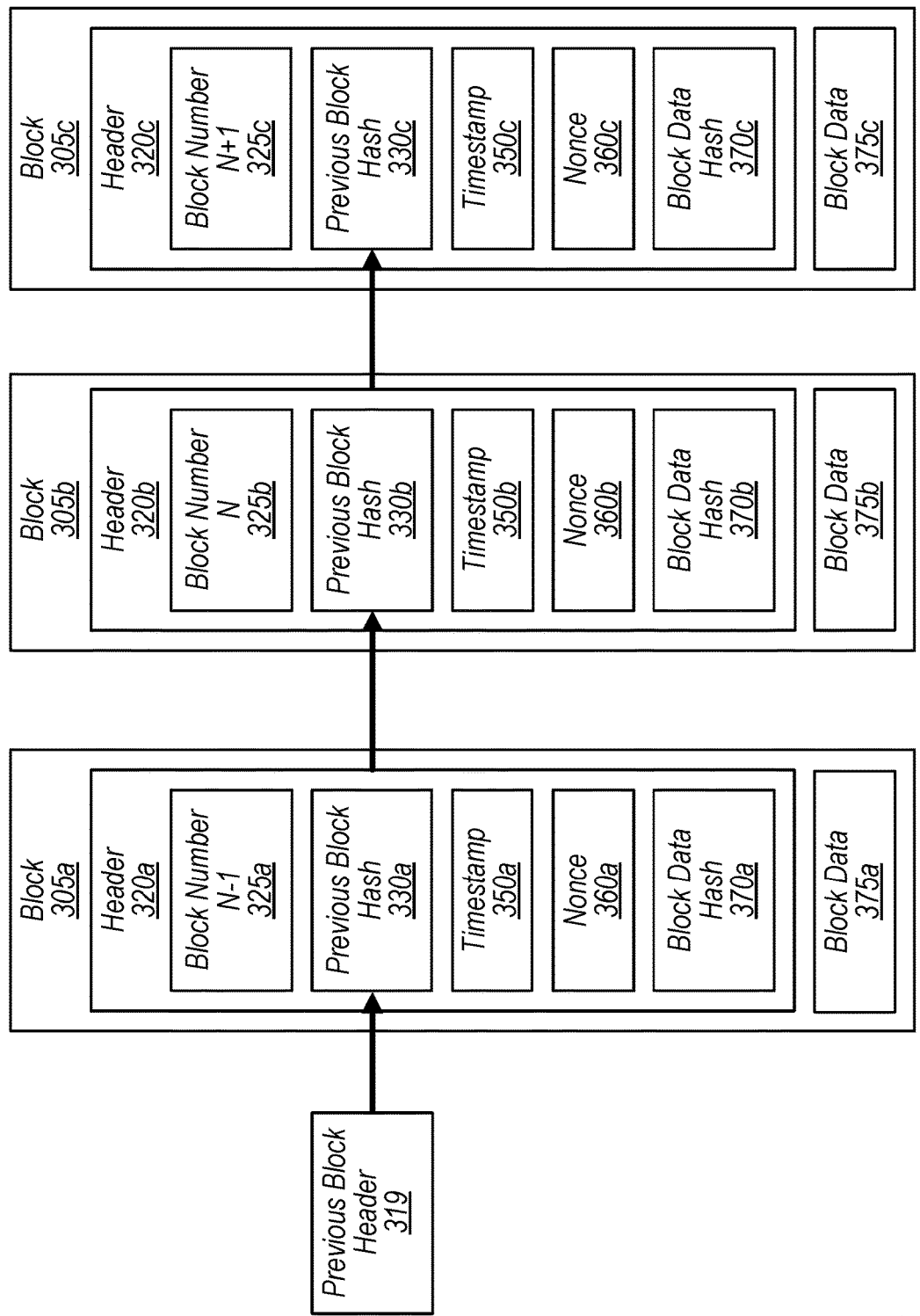
FIG. 3 illustrates an example blockchain.

FIG. 2 shows an example blockchain network 200 comprising a plurality of interconnected nodes 205a-h (generally referred to as nodes 205). Each of the nodes 205 may comprise a computing device 1400 described in more detail with reference to FIG. 6. Although FIG. 2 shows nodes 205 implemented by single devices, each of the nodes 205 may comprise a plurality of devices (e.g., a pool or cluster). The blockchain network 200 may be associated with a blockchain 220. Some or all of the nodes 205 may replicate and save an identical copy of the blockchain 220. For example, FIG. 3 shows that the nodes 205b-e and 205g-h store copies of the blockchain 220. The nodes 205b-e and 205g-h may independently update their respective copies of the blockchain 220 as discussed below.

Blockchain Node Types

Blockchain nodes, for example, the nodes 205, may be full nodes or lightweight nodes. Full nodes, such as the nodes 205b-e and 205g-h, may act as a server in the blockchain network 200 by storing a copy of the entire blockchain 220 and ensuring that transactions posted to the blockchain 220 are valid. The full nodes 205b-e and 205g-h may publish new blocks on the blockchain 220. Lightweight nodes, such as the nodes 205a and 205f, may have fewer computing resources than full nodes. For example, IoT devices often act as lightweight nodes. The lightweight nodes may communicate with other nodes 205, provide the full nodes 205b-e and 205g-h with information, and query the status of a block of the blockchain 220 stored by the full nodes 205b-e and 205g-h. In this example, however, as shown in FIG. 2, the lightweight nodes 205a and 205f may not store a copy of the blockchain 220 and thus, may not publish new blocks on the blockchain 220.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization. Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals. Moreover, read permissions for the blockchain 220 may be public or restricted while write permissions may be restricted to a controlling or authorized entity.

Blockchain

As discussed above, a blockchain 220 may be associated with a blockchain network 200. FIG. 3 shows an example blockchain 300. The blockchain 300 may comprise a plurality of blocks 305a, 305b, and 305c (generally referred to as blocks 305). The blockchain 300 comprises a first block (not shown), sometimes referred to as the genesis block. Each of the blocks 305 may comprise a record of one or a plurality of submitted and validated transactions. The blocks 305 of the blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205b-e and 205g-h, as a file or in a database.

Blocks

Each of the blocks 305 may comprise one or more data fields. The organization of the blocks 305 within the blockchain 300 and the corresponding data fields may be implementation specific. As an example, the blocks 305 may comprise a respective header 320a, 320b, and 320c (generally referred to as headers 320) and block data 375a, 375b, and 375c (generally referred to as block data 375). The headers 320 may comprise metadata associated with their respective blocks 305. For example, the headers 320 may comprise a respective block number 325a, 325b, and 325c. As shown in FIG. 3, the block number 325a of the block 305a is N−1, the block number 325b of the block 305b is N, and the block number 325c of the block 305c is N+1. The headers 320 of the blocks 305 may include a data field comprising a block size (not shown).

The blocks 305 may be linked together and cryptographically secured. For example, the header 320b of the block N (block 305b) includes a data field (previous block hash 330b) comprising a hash digest of the previous block N−1's header 320a. The hashing algorithm utilized for generating the hash representation may be, for example, secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320c of the block N+1 (block 305c) includes a data field (previous block hash 330c) comprising a hash representation of block N's (block 305b) header 320b.

The headers 320 of the blocks 305 may also include data fields comprising a hash representation of the block data, such as the block data hash 370a-c. The block data hash 370a-c may be generated, for example, by a Merkle tree and by storing the hash or by using a hash that is based on all of the block data. The headers 320 of the blocks 305 may comprise a respective nonce 360a, 360b, and 360c. In some implementations, the value of the nonce 360a-c is an arbitrary string that is concatenated with (or appended to) the hash of the block. The headers 320 may comprise other data, such as a difficulty target.

The blocks 305 may comprise a respective block data 375a, 375b, and 375c (generally referred to as block data 375). The block data 375 may comprise a record of validated transactions that have also been integrated into the blockchain 200 via a consensus model (described below). As discussed above, the block data 375 may include a variety of different types of data in addition to validated transactions. Block data 375 may include any data, such as text, audio, video, image, or file, that may be represented digitally and stored electronically.

Blockchain Transaction

Figure 4:
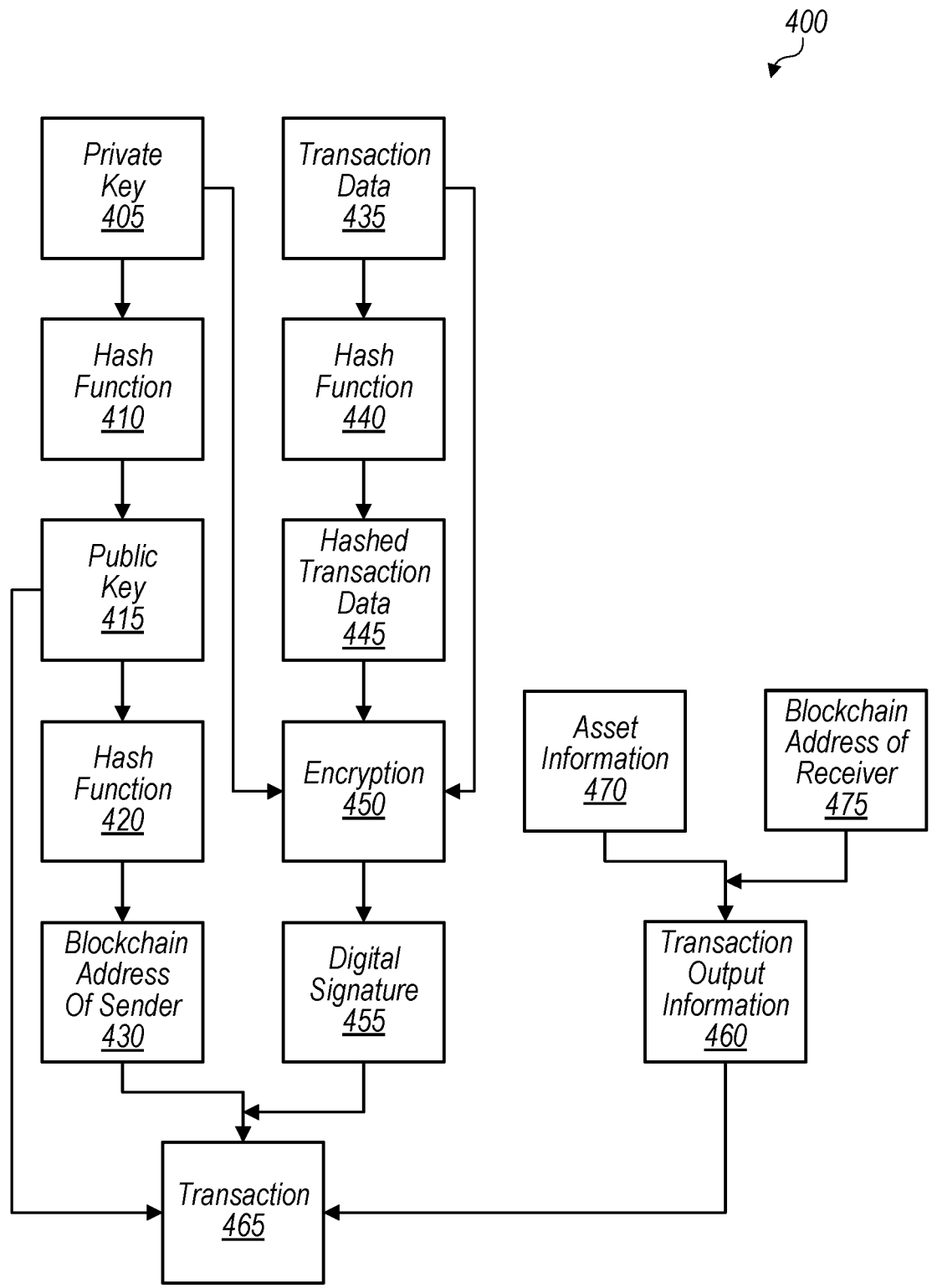
FIG. 4 is a diagram of an example transaction message.

In one example, a blockchain based transaction may generally involve a transfer of data or value or an interaction between entities and described in more detail below. Referring back to FIG. 1, transaction service 160 provided by computer system 150 is operable to facilitate a blockchain transaction between entities. The entities may include users, devices, etc. Referring now to FIG. 4, block diagram illustrates an example of the generation of a transaction to be recorded on the blockchain. For the purposes of the discussion of FIG. 4, first internal user 102 performing an outgoing external transaction with second external user 108. It will be understood, however, that this discussion is applicable to any transaction that is recorded on the blockchain. Additionally, in various embodiments, a particular blockchain network 130 may allow transactions to include multiple sources. In such embodiments, therefore, cryptographic indicators for each source user account may be used as discussed herein. For example, if a particular transaction involves first internal user 102 and second internal user 104 transferring digital assets to second external user 108, public key and private keys associated with both first internal user 102 and second internal user 104 are used to generate transaction 465 as discussed below.

The first internal user 102 may request or initiate a transaction with the second external user 108 via a user application executing on the first internal client device 120. The transaction may be related to a transfer of value or data from the first internal user 102 to the second external user 108. The value or data may represent money, a contract, property, records, rights, status, supply, demand, alarm, trigger, or any other asset that may be represented in digital form. The transaction may represent an interaction between the first internal user 102 and the second external user 108.

FIG. 4 is a diagram of a transaction 465 generated by the transaction service 160. The transaction 465 may include a public key 415, a blockchain address of sender 430 associated with the first internal user 102, a digital signature 455, and transaction output information 460. The transaction application may derive a public key 415 from a private key 405 of the first internal user 102 by applying a cryptographic hash function 410 to the private key 405. The cryptographic hash function 410 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The transaction application may derive an address or identifier for the first internal user 102, such as the blockchain address of sender 430, by applying a hash function 420 to the public key 415. Briefly, a hash function is a function that may be used for mapping arbitrary size data to fixed size data. The value may also be referred to as a digest, a hash value, a hash code, or a hash. In order to prove that the first internal user 102 is the originator of the transaction 465, the transaction service 160 may generate the digital signature 455 for the transaction data 435 using the private key 405 of the first internal user 102. The transaction data 435 may include information about the assets to be transferred and a reference to the sources of the assets, such as previous transactions in which the assets were transferred to the first internal user 102 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first internal user 102 resulting in the digital signature 455.

The transaction output information 460 may include asset information 470 (e.g., what digital asset is being transferred) and an address or identifier for the second external user 108, such as the blockchain address 475 corresponding to the second external user 108 (e.g., a public key corresponding to second external user 108). The transaction 465 may be broadcast from computer system 150 in response to a request sent from the first internal client device 120 to computer system 150.

Accordingly, in various embodiments, a particular transaction 465 between one or more transferee user account and a transferor user account includes one or more public cryptographic keys corresponding to the transferor(s), a digital signature 455 generated from transaction data 435 that has been hashed and encrypted using private cryptographic keys corresponding to the transferor(s), and transaction output information including asset information and a cryptographic indicator (e.g., a public key corresponding to second external user 108) of the transferee.

The specific type of cryptographic algorithm being utilized may vary dynamically based on various factors, such as a length of time, security concerns, etc. For example, the type of cryptographic algorithm being utilized may be changed yearly, weekly, daily, etc. The type of algorithms may also change based on varying levels of security. For example, an owner of content may implement a higher level of protection or security by utilizing a stronger algorithm.

Figure 7A:
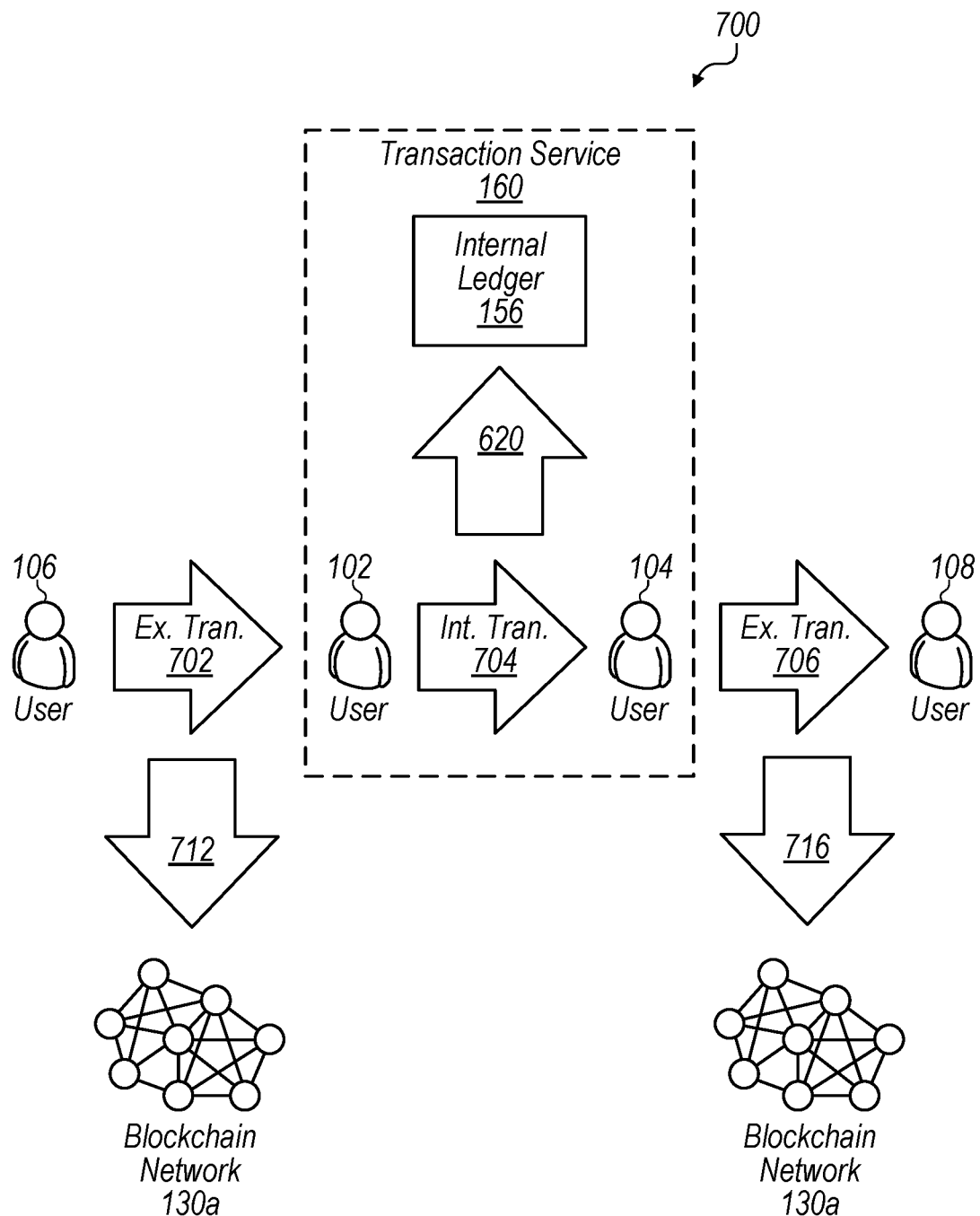
FIG. 7A illustrates a first example network of transactions facilitated by the transaction service of FIG. 1 including external and internal transactions.
Figure 7B:
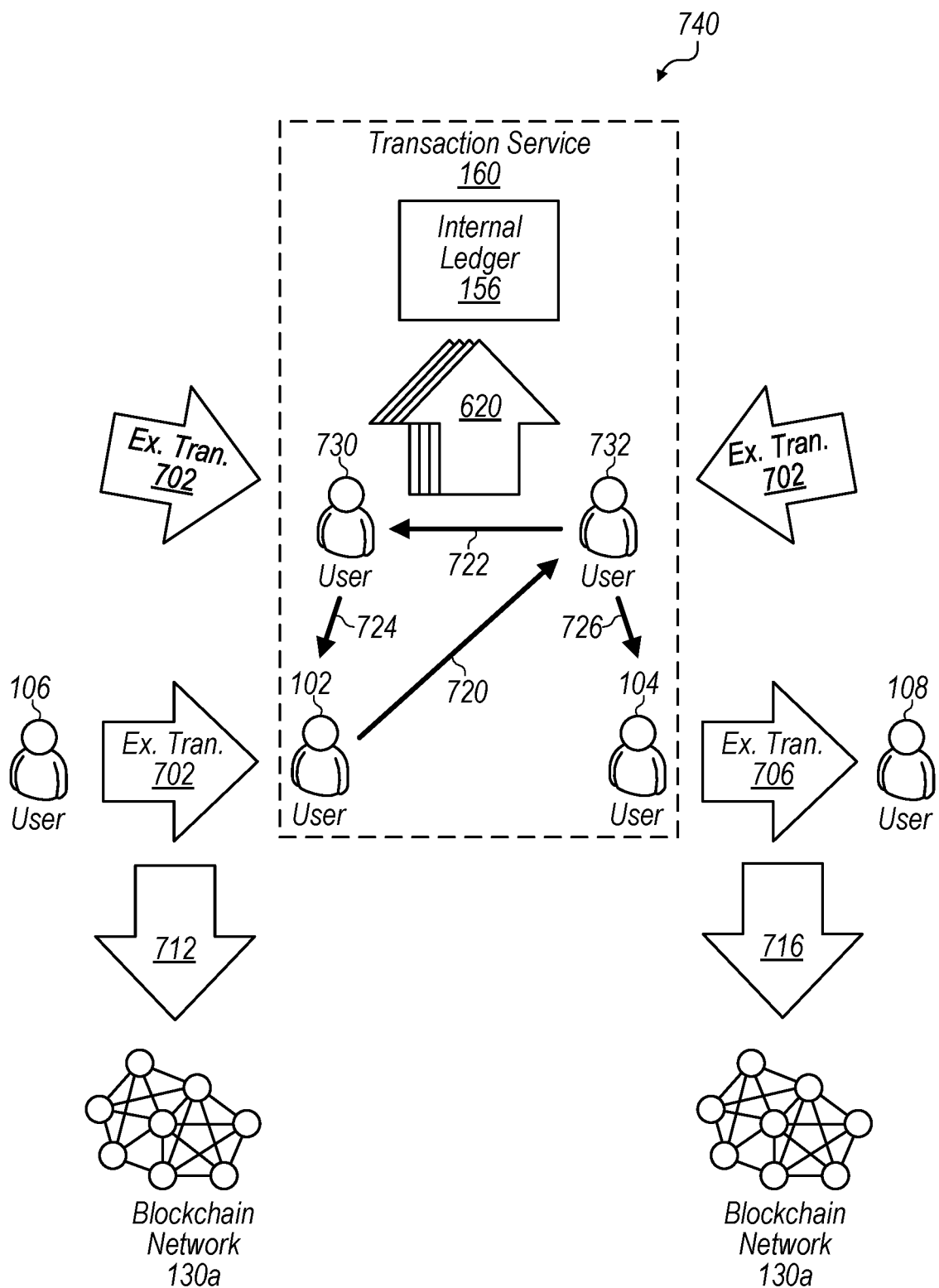
FIG. 7B illustrates a second example network of transactions facilitated by the transaction service of FIG. 1 including external and internal transactions.

As discussed in additional detail in reference to FIGS. 7A and 7B, in various embodiments because internal transaction are recorded on internal ledger 156 and not the blockchain, where another internal user has internally transferred digital assets to the particular internal user, when the particular internal user requests a transaction 465 be generated transferring digital assets to an external user account, the transaction 465 itself may instead reflect a transfer from the other internal user to the external user account. That is, if first internal user 102 has internally transferred digital assets to second internal user 104, when second internal user 104 requests transaction 465 transferring digital assets to first external user 108, the transaction 465 is generated using private key 405 and public key 415 of first internal user 102 in various embodiments. In such instances, this is because the ownership of the digital assets by second internal user 104 is not recorded on the blockchain, and the blockchain still indicates that first internal user 102 owns the digital assets. In such embodiments, the transaction output information 460 is also indicative of a transfer from first internal user 102 to the external user account. In so doing, the internal transaction from first internal user 102 to second internal user 104 (that was recorded on internal ledger 156) may be reconciled with the distributed ledger recorded using blockchain networks 130 without separately recording the internal transaction.

Blockchain Addresses

A blockchain network may utilize blockchain addresses to indicate an entity using the blockchain or start and end points in the transaction. For example, a blockchain address for the first internal user 102, shown in FIG. 4 as the blockchain address of sender 430, may include an alphanumeric string of characters derived from the public key 415 of the first internal user 102 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person etc., and through other types of identification information such as account numbers, home address, social security number, formal name, etc.

Broadcasting Transaction

Figure 5:
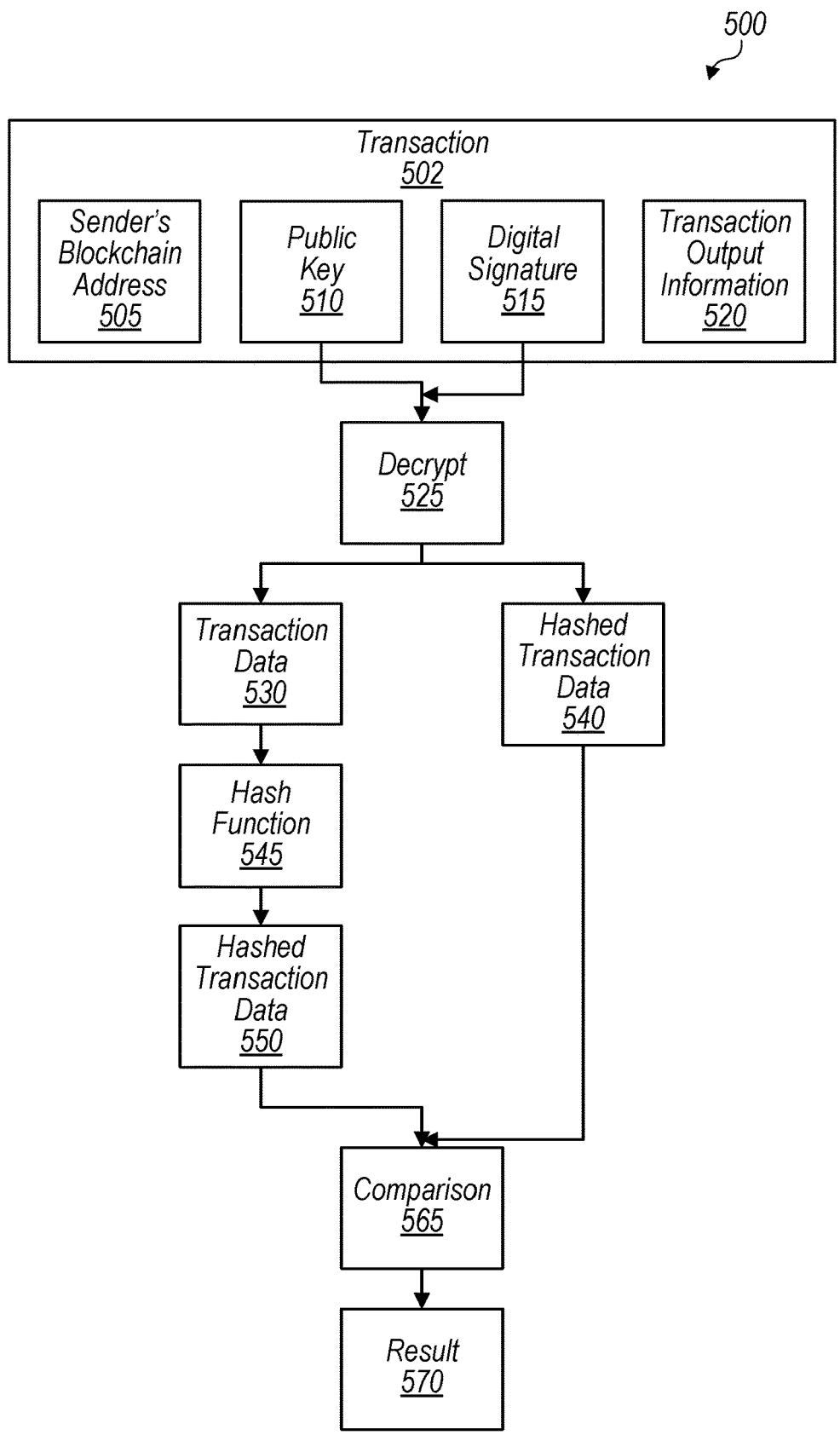
FIG. 5 shows an example transaction broadcast the blockchain network.

The computer system 150 may receive transactions from internal users of the blockchain network 130 (and in some embodiments from external users of the blockchain network 130 as well). The transactions may be submitted to the computer system 150 via desktop applications, smartphone applications, digital wallet applications, web services, or other software applications. In instances of internal transactions, computer system 150 records the results in internal ledger 156. In instances of outgoing external transactions, the computer system 150 may send or broadcast the transactions to the blockchain network 130. FIG. 5 shows an example transaction 502 broadcast by the computer system 150 to the blockchain network 130. The transaction 502 may be broadcast to multiple nodes 205 of the blockchain network 130. Typically, once the transaction 502 is broadcast or submitted to the blockchain network 130, it may be received by one or more of the nodes 205. Once the transaction 502 is received by the one or more nodes 205 of the blockchain network 130, it may be propagated by the receiving nodes 205 to other nodes 205 of the blockchain network 130.

A blockchain network may operate according to a set of rules. The rules may specify conditions for broadcasting a transaction to a node. For example, a transaction may be broadcast to one or more specific nodes based on criteria related to the node's geography, history, reputation, market conditions, docket/delay, technology platform. The rules may be dynamically modified or updated (e.g., turned on or off) to address issues such as latency, scalability and security conditions. A transaction may be broadcast to a subset of nodes as a form of compensation to entities associated with those nodes (e.g., through receipt of compensation for adding a block of one or more transactions to a blockchain).

Transaction Validation—User Authentication and Transaction Data Integrity

Not all the full nodes 205 may receive the broadcasted transaction 502 at the same time, due to issues such as latency. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing user authenticity and transaction data integrity. User authenticity may be established by determining whether the sender indicated by the transaction 502 is in fact the actual originator of the transaction 502. User authenticity may be proven via cryptography, for example, asymmetric-key cryptography using a pair of keys, such as a public key and a private key. Additional factors may be considered when establishing user authenticity, such as user reputation, market conditions, history, transaction speed, etc. Data integrity of the transaction 502 may be established by determining whether the data associated with the transaction 502 was modified in any way. Referring back to FIG. 4, when the transaction application creates the transaction 465, it may indicate that the first internal user 102 is the originator of the transaction 465 by including the digital signature 455.

The node 205 may decrypt the digital signature 515 using the public key 510. A result of the decryption may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 is operable to store transaction in the mempool to be queried by miners. As discussed herein, miners include transactions in blocks during the mining process. When a miner has successfully assembled a block, such blocks are submitted to the nodes 205 who add the blocks to the blockchain. Such processing of transactions in blocks allows for consensus to be reached with a small amount of inter-node communication.

Architecture of Computer System 150

Figure 6:
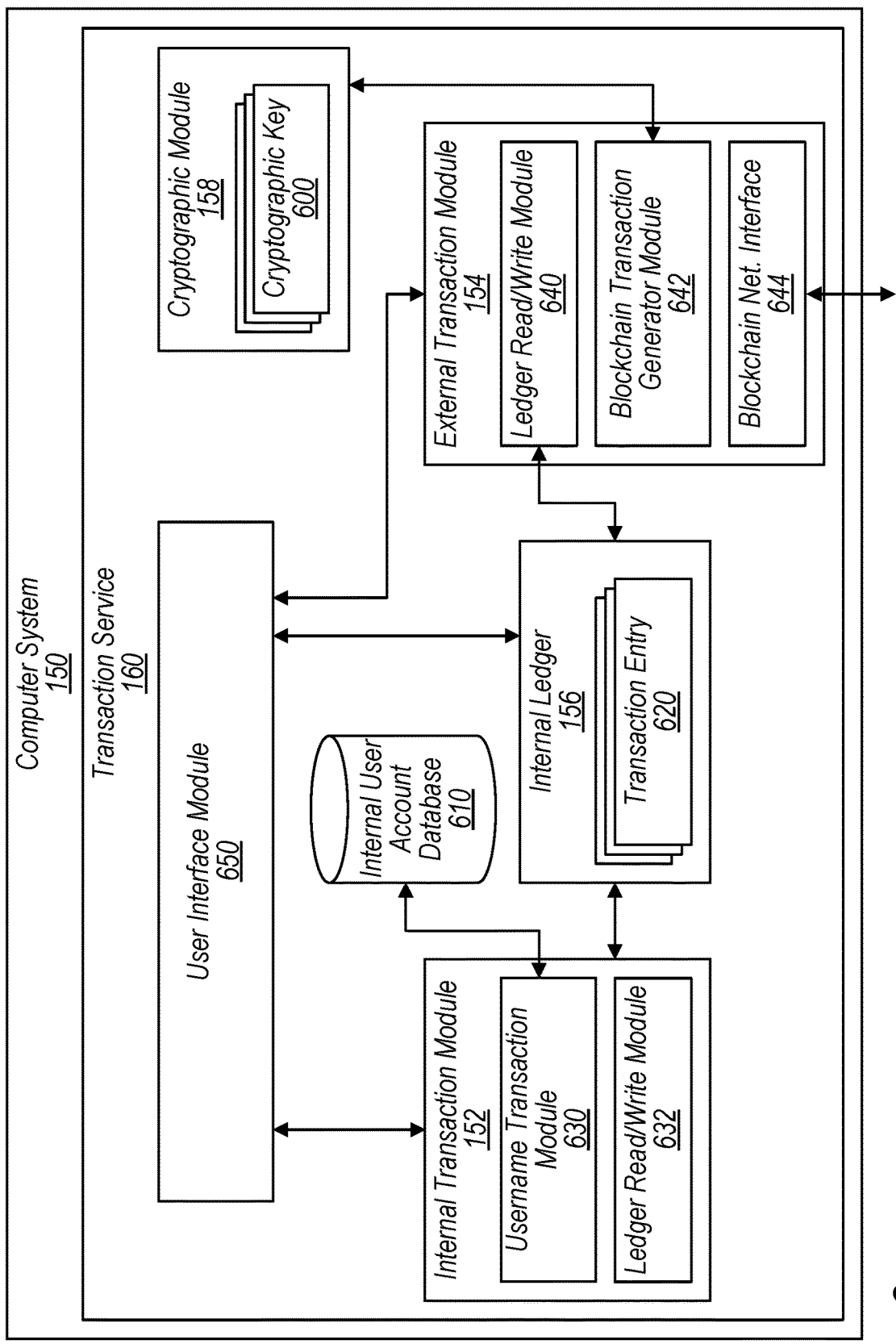
FIG. 6 is an expanded view of the computer system of FIG. 1.

Referring now to FIG. 6, an expanded block diagram of computer system 150 is shown. As in FIG. 1, computer system 150 provides transaction service 160, which includes internal transaction module 152, external transaction module 154, internal ledger 156, and cryptographic module 158. As shown in FIG. 6, transaction service 160 includes one or more internal user account databases 610 and a user interface 650.

In various embodiments, internal transaction module 152 is operable to facilitate transactions between internal users (e.g., a transaction between first internal user 102 and second internal user 104). As discussed herein, in various embodiments, internal transactions are performed in response from an internal user account (e.g., the transferor internal user account, the transferee internal user account) that is received via user interface 650. In a given internal transaction, a digital asset is transferred from a transferor internal user account to transferee internal user account. In some embodiment, an internal transaction may involve only a single transferor internal user account and only a single transferee internal user account, but in other embodiments multiple transferor internal user accounts may transfer to a single internal user account, a single transferor internal user account may transfer to multiple internal user account. For example, upon request from first internal user 102, an internal transaction may transfer ownership of one or more digital assets from the first internal user account to the user account of a second internal user 104.

A ledger read/write module 632 is operable to record the internal transactions as transaction entries 620 to the internal ledger 156. As discussed herein, in various instances the actual owner of a particular digital asset may not be the owner that is recorded on the blockchain because internal transaction that occurred subsequently to the transactions recorded on the blockchain resulted in a different ownership state. For example, if first internal user 102 has internally transferred digital asset A to second internal user 104, this internal transaction is not recorded on the blockchain as discussed herein. Accordingly, after an internal transaction has been requested, ledger read/write module 632 access internal ledger 156 prior to effectuating the internal transaction. If the digital asset corresponding to the requested internal transaction is not owned by the requesting internal user, then the requested internal transaction will be denied in various embodiments. Similarly, if the digital asset involved in the requested internal transaction was previously internally transferred then the ledger read/write module 632 is operable to update the internal ledger to record the updated chain of ownership. Thus, ledger read/write module 632 is operable, in response to a request from an internal user, to (a) access the internal ledger 156 and (b) based on the prior state of the internal ledger 156, write a transaction entry to the internal ledger 156 to record the requested internal transaction.

In various embodiment, internal transactions are initiated in response to requests that do not include a cryptographic indication of the transferee internal user account. As discussed above in reference to FIG. 4, in various embodiment, transactions 465 to be recorded on the blockchain (e.g., an incoming external transaction, an outgoing external transaction) include cryptographic indicators of both the transferor(s) and the transferee for the transaction 465. In contrast to such external transactions, in various embodiments internal transactions do not include cryptographic indicators for the transferor(s) and transferee. For example, a request for an internal transaction may instead include a non-cryptographic indicator of the transferee such as a username, email address, phone number, or given name of the transferee. For example, first internal user 102 may log into transaction service 160, and enter the email address of second internal user 104 into user interface 650 to request an internal transaction be performed. Accordingly, in various embodiments, first internal user 102 does not need to know or have access to the blockchain address of second internal user 104 (as first internal user 102 would to initiate an outgoing external transaction to first external user 106 or second external user 108). In such embodiments, a username transaction module 630 is operable to access internal user account database 610 to look up the account information corresponding to the username (or name, phone number, etc.) included in the request to initiate the internal transaction. In various embodiments, the internal user account database 610 includes a unique identifier corresponding to the various internal user accounts. In some embodiments, the unique identifier is a public key for the transferee such as the blockchain address of the transferee.

In various embodiments, internal ledger 156 is useable to record various internal transactions between internal user accounts and is useable by external transaction module 154 to prepare indications of outgoing external transactions that reflect the off-blockchain internal transactions when causing outgoing external transactions to be recorded. In various embodiments, the individual internal transactions are recorded as transaction entries 620. The transaction entries 620 include an identifier of the transferor user account(s), an identifier of the transferee user accounts(s), and an indicator of the digital assets transferred in the internal transaction. For example, in an example where the digital asset is cryptocurrency, the transaction entry 620 recording a transfer of ten units of cryptocurrency from the account of first internal user 102 to the account of second internal user 104, the transaction entry might include the blockchain addresses the account of first internal user 102 and the account of second internal user 104 and transaction data indicating a decrement of ten units from first internal user 102 and an increment of ten units for second internal user 104. In various embodiments, transaction entries 620 include other information such as the time and date the internal transaction was requested, the time and date the internal transaction was executed, and information about the transfer request such as the IP address from which the transfer was requested. In various embodiments, transaction entries 620 may be analyzed to detect fraudulent requests prior to executing the internal transactions.

In various embodiments, external transaction module 154 is operable to access internal ledger 156 when preparing transactions (e.g., transactions 465 discussed in reference to FIG. 4) to broadcast to blockchain networks 130. As will be understood, when an incoming external transaction transfers ownership of digital assets, the blockchain records a first state of ownership of digital assets (e.g., cryptocurrency). After one or more internal transactions, however, the ownership of digital assets is in a different, second state as a result. Then, as a result of a subsequent outgoing external transaction, at least some of the ownership recorded on the blockchain is updated to the second state by causing one or more blocks to be added to the blockchain. For example, if first external user 106 transfers digital asset A to first internal user 102, the blockchain will reflect this transfer as discussed herein. If first internal user 102 transfers ownership of digital asset A to second internal user 104 in an internal transaction, this transfer will be recorded in internal ledger 156 but not the blockchain, which means that the blockchain will still indicate that first internal user 102 is the owner of digital asset A. If second internal user 104 transfers ownership of digital asset A to second external user 108, then blocks will be written to the blockchain that indicate that second external user 108 is the owner of digital asset A and first internal user 102 is not the owner of digital asset A. In various embodiments, the block 305 or one of the blocks 305 recording the outgoing external transaction will be indicative of a transfer of digital asset A from first external user 102 to second external user 108. Two examples of incoming external transactions, one or more internal transactions, and an outgoing external transaction are discussed below in reference to FIGS. 7A and 7B.

External transaction module 154 is operable to receive incoming external transactions and the perform outgoing external transactions as discussed herein. In various embodiments, external transaction module 154 includes a ledger read/write module 640 that is operable to read internal ledger 156 during the generation of outgoing external transactions and to write to internal ledger 156 to reflect the results of incoming internal transactions. External transaction module 154 includes a blockchain transaction generator module 642 useable to generate transactions to be broadcast to blockchain networks as discussed above in reference to FIGS. 4 and 5. In various embodiments, blockchain transaction generator module 642 is operable to access cryptographic keys 600 stored by cryptographic module 158 and use such cryptographic keys 600 to generate transactions to broadcast to blockchain networks 130 as discussed herein. In various embodiments, external transaction module 154 includes a blockchain interface 644 that is operable to perform the transaction broadcast and validation operations discussed in reference to FIG. 10.

As discussed in reference to FIGS. 4 and 5, transactions that are recorded on the blockchain include indications of a public key of the transferee user account (e.g., blockchain address 475 of FIG. 4). Thus, in such embodiments, an incoming external transaction transferring digital assets to first internal user 102 will include the blockchain address 475 of the account of first internal user 102. External transaction module 154 is operable to receive such incoming external transactions using blockchain interface 644.

In various embodiments, cryptographic module 158 stores one or more cryptographic keys 600 corresponding to the internal user accounts of transaction service 160. As discussed in FIGS. 4 and 5, in various embodiments a private key and a public key of a transferor are used to generate a transaction to be broadcast to the blockchain. In some of such embodiments, cryptographic keys 600 includes such private keys and public keys derived from such private keys that are used as blockchain addresses. In various embodiments, such cryptographic key pairs are useable to authenticate transactions for recordation on a blockchain as discussed herein. In other embodiments, such private keys are stored on internal client devices. In such embodiments, external transaction module 154 may be operable to send transaction data back to the requesting internal client device for encryption. In various embodiments, however, storing the private keys at cryptographic module 158 may improve security by reducing the ability for an internal client device to request multiple transactions for the same digital asset. If the internal client device does not have the private key, then the internal client devices does not the ability to submit transactions to the blockchain networks 130. Accordingly, in various embodiments cryptographic module 158 stores the private keys for the internal user account (e.g., the accounts corresponding to first internal user 102 and second internal user 104) such that owners of the internal user accounts cannot access the private cryptographic keys. In some embodiments, a private key for a particular internal user account is divided into multiple pieces such that the internal user retains a first portion (e.g., the first half) of the private key and the cryptographic module 158 stores a second portion (e.g., the second half) of the private key. In such embodiments, the first portion and second portion would have to be brought together to record transactions on the blockchain. Accordingly, in such embodiments both the particular internal user and the transaction service 160 would have to approve a transaction before it is submitted to the blockchain. Thus, in various embodiments, owners of internal user accounts are only able to access their internal user accounts through the transaction service 160.

In various embodiments, transaction service 160 includes a user interface 650 that is operable to present information to and receive information from internal users. In various embodiments, user interface 650 is implemented as a website displayed on internal client devices or as an app installed on internal client devices. In various embodiments, because transaction service 160 controls the private keys of internal user accounts, internal users may only access their account (and access the digital assets owned by their account) through user interface 650. In various embodiments, user interface 650 is operable to present internal users with access to the digital assets in their respective internal user accounts. In instances where the digital assets are pieces of media (e.g., images, audio, video) user interface 650 may be operable to cause such media to be presented on the particular internal user device that a particular internal user is using. In instances where the digital assets include cryptocurrency, user interface 650 may be operable to present an account balance of cryptocurrency. As discussed herein, in various instances the ownership of digital assets as recorded on the blockchain differs from the actual ownership because of internal transaction that occurred subsequently to the transactions that are recorded on the blockchain. For example, an incoming external transaction indicates that first internal user 102 is the owner of a first digital asset. Subsequent to the incoming external transaction, however, first internal user 102 internally transfers the first digital asset to second internal user 104. In such an instance, the blockchain would still show that the first digital asset is owned by first internal user 102, but internal ledger 156 indicates that second internal user 104 is the owner. In instances where internal users must user transaction service to access their accounts, user interface 650 may be operable to adjust the state of recorded on the blockchain according to internal ledger 156. Thus, in such an embodiment, having transferred the first digital asset, (a) the user interface 650 presented to first internal user 102 would indicate that first digital asset is not assigned to the account of first internal user 102, and (b) the user interface 650 presented to second internal user 104 would indicate that first digital asset is assigned to the account of second internal user 104.

Accordingly, in various embodiments, the architecture of computer system 150 is operable to facilitate on-blockchain external transaction transferring assets to particular user accounts and transferring asset from particular user account using cryptographic keys for the particular user accounts. But, because internal transactions are not on-blockchain, the number of transactions that must be broadcast to blockchain networks 130 for recording is reduced. Because, in various embodiments, computer system 150 controls the private keys of internal user accounts, internal user account are unable to access their private keys to attempt to add fraudulent transactions to the blockchain. Moreover, in such embodiment, computer system 150 is operable to adjust the on-blockchain ownership record to reflect the subsequent internal transactions recorded in internal ledger 156, allowing an accurate presentation of the state of digital asset ownership to be presented to internal users using user interface 650.

Internal and External Transactions

Referring now to FIGS. 7A and 7B, two example graphs of external and internal transactions are shown. Referring now to FIG. 7A, a graph 700 of transactions between two external users and two internal users is shown. In particular, in an incoming external transaction 702, first external user 106 transfers one or more digital assets to first internal user 102. To record incoming external transaction 702, a transaction 712 (e.g., a transaction generated according to FIG. 4) is broadcast to first blockchain network 130*a* for recording as discussed herein. Subsequently, in an internal transaction 704 initiated by first internal user 102, first internal user 102 transfers one or more digital assets to second internal user 104. As discussed herein, internal transaction 702 is not broadcast to first blockchain network 130*a* for recording as discussed herein. Rather, a transaction entry 620 is written to internal ledger 156 to record the internal transaction 702. Then, in an outgoing external transaction 706 initiated by second internal user 104, second internal user 104 transfers digital assets to second external user 108. To record outgoing external transaction 706, a transaction 716 (e.g., a transaction generated according to FIG. 4) is broadcast to first blockchain network 130*a* for recording as discussed herein.

In some instances, transaction 712 is recorded as first external user 106 transferring one or more digital assets to first internal user 102 and transaction 716 is recorded as second internal user 104 transferring digital assets to second external user 108. In some embodiments, in such instances, transaction 712 is authenticated using a private key corresponding to first external user 106 and public keys of first external user 106 and first internal user 102 (e.g., a cryptographic key 600) as discussed here. In other instances, however, transaction is recorded as first internal user 102 transferring digital assets to second external user 108 to reconcile the internal transaction 704 with the blockchain network 130. As recited herein, even though second internal user 104 is the entity requesting the outgoing external transaction 706, transaction 716 recorded on the blockchain shows first internal user 102 "directly" transferring digital assets to second external user 108. In some instances, no reference to second internal user 104 is included in transaction 716 as recorded. Thus, in some embodiments, in such instances, transaction 716 is authenticated using a private key corresponding to first internal user 102 (e.g., a cryptographic key 600) and public keys of first internal user 102 (e.g., another cryptographic key 600) and second external user 108 as discussed herein.

In instances where the digital assets are not fungible (e.g., unique non-fungible tokens), for example, transaction 716 is recorded as first internal user 102 transferring digital assets to second external user 108 and the ownership of the non-fungible digital asset by second internal user 104 is not recorded on the blockchain at all. In instances there the digital assets are fungible (e.g., cryptocurrency), various scenarios regarding what is recorded in transaction 716 may occur depending on the amount of digital assets owned by the internal users prior to incoming internal transaction 702 and the amount of digital assets involved in incoming external transaction 702, internal transaction 704, and outgoing external transaction 706.

In a first example, prior to incoming external transaction 702, neither first internal user 102 nor second internal user 104 own any cryptocurrency. In incoming external transaction 702, ten units of cryptocurrency are transferred from first external user 106 to first internal user 102. In internal transaction 704, five units of cryptocurrency are transferred from first internal user 102 to second internal user 104, leaving first internal user 102 and second internal user 104 with five units of cryptocurrency as recorded in internal ledger 156. In outgoing external transaction 706, second internal user 104 transfers five cryptocurrency to second external user 108. In this example, transaction 716 is recorded as first internal user 102 transferring five units of cryptocurrency to second external user 108, which reconciles internal transaction 704 with the distributed ledger recorded on the blockchain, and allows computer system 150 to clear the transaction entry 620 in various embodiments.

In a second example, prior to incoming external transaction 702, neither first internal user 102 nor second internal user 104 own any cryptocurrency. In incoming external transaction 702, ten units of cryptocurrency are transferred from first external user 106 to first internal user 102. In internal transaction 704, five units of cryptocurrency are transferred from first internal user 102 to second internal user 104, leaving first internal user 102 and second internal user 104 with five unity of cryptocurrency as recorded in internal ledger 156. In outgoing external transaction 706, second internal user 104 transfers two cryptocurrency to second external user 108. In this example, transaction 716 is recorded as first internal user 102 transferring two units of cryptocurrency to second external user 108. In some embodiments, a second transaction 716 may also be recorded on the blockchain as a second block transferring three units of cryptocurrency from first internal user 102 to second internal user 104 to fully record the results of internal transaction 704. In other embodiments, however, the three remaining units of cryptocurrency owned by second internal user 104 will be recorded in internal ledger 156 and not on the blockchain.

In a third example, prior to incoming external transaction 702, first internal user 102 does not own any cryptocurrency but second internal user 104 owns five units of cryptocurrency. In incoming external transaction 702, ten units of cryptocurrency are transferred from first external user 106 to first internal user 102. In internal transaction 704, five units of cryptocurrency are transferred from first internal user 102 to second internal user 104, leaving first internal user 102 with five units of cryptocurrency and second internal user 104 with ten units of cryptocurrency as recorded in internal ledger 156. In outgoing external transaction 706, second internal user 104 transfers ten cryptocurrency to second external user 108. In this example, transaction 716 is recorded as first internal user 102 transferring five units of cryptocurrency and second internal user 104 transferring five units of cryptocurrency to second external user 108, which reconciles internal transaction 704 with the distributed ledger recorded on the blockchain, and allows computer system 150 to clear the transaction entry 620 in various embodiments. In this example, transaction 716 is authenticated using a first private key corresponding to first internal user 102 (e.g., a first cryptographic key 600), a second private key corresponding to second internal user 104 (e.g., a second cryptographic key 600) and public keys of first internal user 102 (e.g., a third cryptographic key 600), second internal user 104 (e.g., a fourth cryptographic key 600), and second external user 108 as discussed herein.

In a fourth example, prior to incoming external transaction 702, first internal user 102 does not own any cryptocurrency but second internal user 104 owns five units of cryptocurrency. In incoming external transaction 702, ten units of cryptocurrency are transferred from first external user 106 to first internal user 102. In internal transaction 704, five units of cryptocurrency are transferred from first internal user 102 to second internal user 104, leaving first internal user 102 with five units of cryptocurrency and second internal user 104 with ten units of cryptocurrency as recorded in internal ledger 156. In outgoing external transaction 706, second internal user 104 transfers five cryptocurrency to second external user 108. In this example, transaction 716 is recorded as first internal user 102 transferring five units of cryptocurrency to second external user 108. While transaction 716 might have been recorded as second internal user 104 transferring five units of cryptocurrency to second external user 108, recording the transaction as first internal user 102 transferring five units of cryptocurrency to second external user 108 reconciles internal transaction 704 with the distributed ledger recorded on the blockchain, and allows computer system 150 to clear the transaction entry 620.

Referring now to FIG. 7B, a graph 740 of transactions between two external users and four internal users is shown. In contrast to graph 700 of FIG. 7A, graph 740 is more complex because of the addition of two more internal users (e.g., third internal user 730 and fourth internal user 732) and four internal transactions 720, 722, 724, and 726. In three incoming external transactions 702, first external user 106 transfers one or more digital assets to first internal user 102 and sources not shown in FIG. 7B transfer digital assets to third internal user 730 and fourth internal user 732. As discussed herein, each incoming external transaction 702 is recorded on the blockchain (e.g., transaction 712 is broadcast to first blockchain network 130a for recording a transfer between first external user 106 and first internal user 102 as discussed herein). Subsequently, in a first internal transaction 720, first internal user 102 transfers digital assets to fourth internal user 732. In a second internal transaction 722, fourth internal user 732 transfers digital assets to third internal user 730. In a third internal transaction 724, third internal user 730 transfers digital assets to first internal user 102. In a fourth internal transaction 726, fourth internal user 732 transfers digital assets to second internal user 104. As discussed herein, internal transactions 720, 722, 724, and 726 are not broadcast to first blockchain network 130a for recording as discussed herein. Rather, transaction entries 620 are written to internal ledger 156 to record the internal transactions 720, 722, 724, and 726. Then, in an outgoing external transaction 706 initiated by second internal user 104, second internal user 104 transfers digital assets to second external user 108. To record outgoing external transaction 706, a transaction 716 (e.g., a transaction generated according to FIG. 4) is broadcast to first blockchain network 130a for recording as discussed herein.

As with FIG. 7A, what is in transaction 716 that is broadcast to first blockchain network 130a for recording depends on the order in which the internal transactions 720, 722, 724, and 726 occur (e.g., first internal transaction 720 does not necessarily occur first in time) and what digital assets are transferred. In various instances, transaction 716, which is initiated by second internal user 104, may result in a transaction 716 being broadcast to record a transfer to second external user 104 from first internal user 102, second internal user 104, third internal user 730, fourth internal user 732, or any combination.

In a first example, prior to any transactions represented in graph 740, second internal user 104 owns ten units of cryptocurrency and the incoming internal transactions 702 result in ten units of cryptocurrency being transferred to first internal user 102, third internal user 730, and fourth internal user 732. Fourth internal user 732 internally transfers ten units of cryptocurrency to third internal user 730 (second internal transaction 722), third internal user 730 transfers twenty units of cryptocurrency to first internal user 102 (third internal transaction 724), first internal user 102 transfers thirty units of cryptocurrency to fourth internal user 732 (first internal transaction 720), and then fourth internal user 732 transfers thirty units of cryptocurrency to second internal user 104 (fourth internal transaction 726).

In outgoing external transaction 706, second internal user 104 transfers forty units of cryptocurrency to second external user 108. In this example, transaction 716 is recorded as first internal user 102 transferring ten units of cryptocurrency, second internal user 104 transferring ten units of cryptocurrency, third internal user 730 transferring ten units of cryptocurrency, and fourth internal user 732 transferring ten units of cryptocurrency to second external user 108, which reconciles the internal transactions 720, 722, 724, and 726 with the distributed ledger recorded on the blockchain, and allows computer system 150 to clear the transaction entries 620 in various embodiments. In various embodiments, in this example, transaction 716 is authenticated using a first private key corresponding to first internal user 102 (e.g., a first cryptographic key 600), a second private key corresponding to second internal user 104 (e.g., a second cryptographic key 600), a third private key corresponding to third internal user 730 (e.g., a third cryptographic key 600), and a fourth private key corresponding to fourth internal user 104 (e.g., a fourth cryptographic key 600) and public keys of first internal user 102 (e.g., a fifth cryptographic key 600), second internal user 104 (e.g., a sixth cryptographic key 600), third internal user 730 (e.g., a seventh cryptographic key 600), fourth internal user 104 (e.g., an eighth cryptographic key 600), and second external user 108 as discussed herein.

In another example, second internal user 104 does not have ten units of cryptocurrency at the start and internal transactions 720, 722, 724, and 724 are the same. In this example, rather than transferring forty units of cryptocurrency in outgoing external transaction 706, second internal user 104 transfers twenty-five units of cryptocurrency to second external user 108. As a result, second internal user 104 will be left with five units and one or more transactions 716 recording a transfer of twenty-five units must be broadcast. In some of such embodiments, computer system 150 is configured to reconcile internal transactions 720, 722, 724, and 726 all at once by causing at least two blocks to be written to the blockchain: in a first block one of first internal user 102, third internal user 730, or fourth internal user 732 transfers five unity to second internal user 104 in an on-blockchain transaction and in a second block first internal user 102, third internal user 730, and fourth internal user 732 transfer a total of twenty-five units of cryptocurrency to second external user 108 as discussed herein.

In some embodiments, an on-blockchain transaction reconciling one or more internal transactions records a transfer between internal users who never directly engaged in an internal transaction. For example, as shown in FIG. 7B, second internal user 104 never engaged in an internal transaction with first internal user 102 or third internal user 730, but in various embodiments an on-blockchain transaction may be record a transfer from either to second internal user 104 depending on the internal transactions 720, 722, 724, and 726 and the outgoing external transactions 706.

In various embodiments, however, blockchain transactions can only include a limited amount of data (e.g., 10 MB) and if too many internal user accounts are transferring digital assets in the same outgoing external transactions (e.g., because of a change in ownership due to internal transactions), the transactions 716 broadcast to blockchain networks 130 may be split into multiple transactions.

Figure 8:
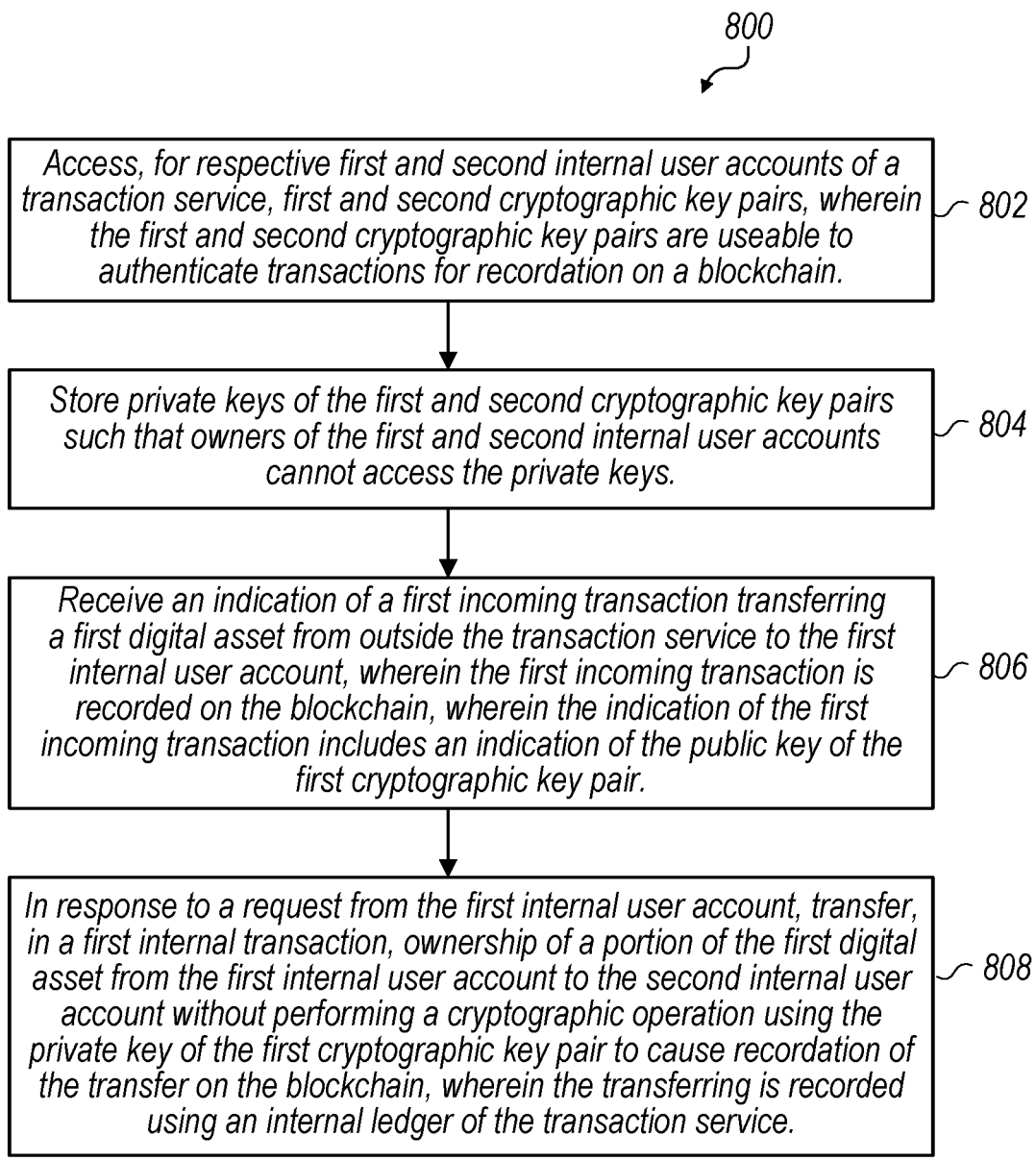
FIG. 8 is flowchart illustrating an embodiment of a transaction facilitation method in accordance with the disclosed embodiments.
Figure 9:
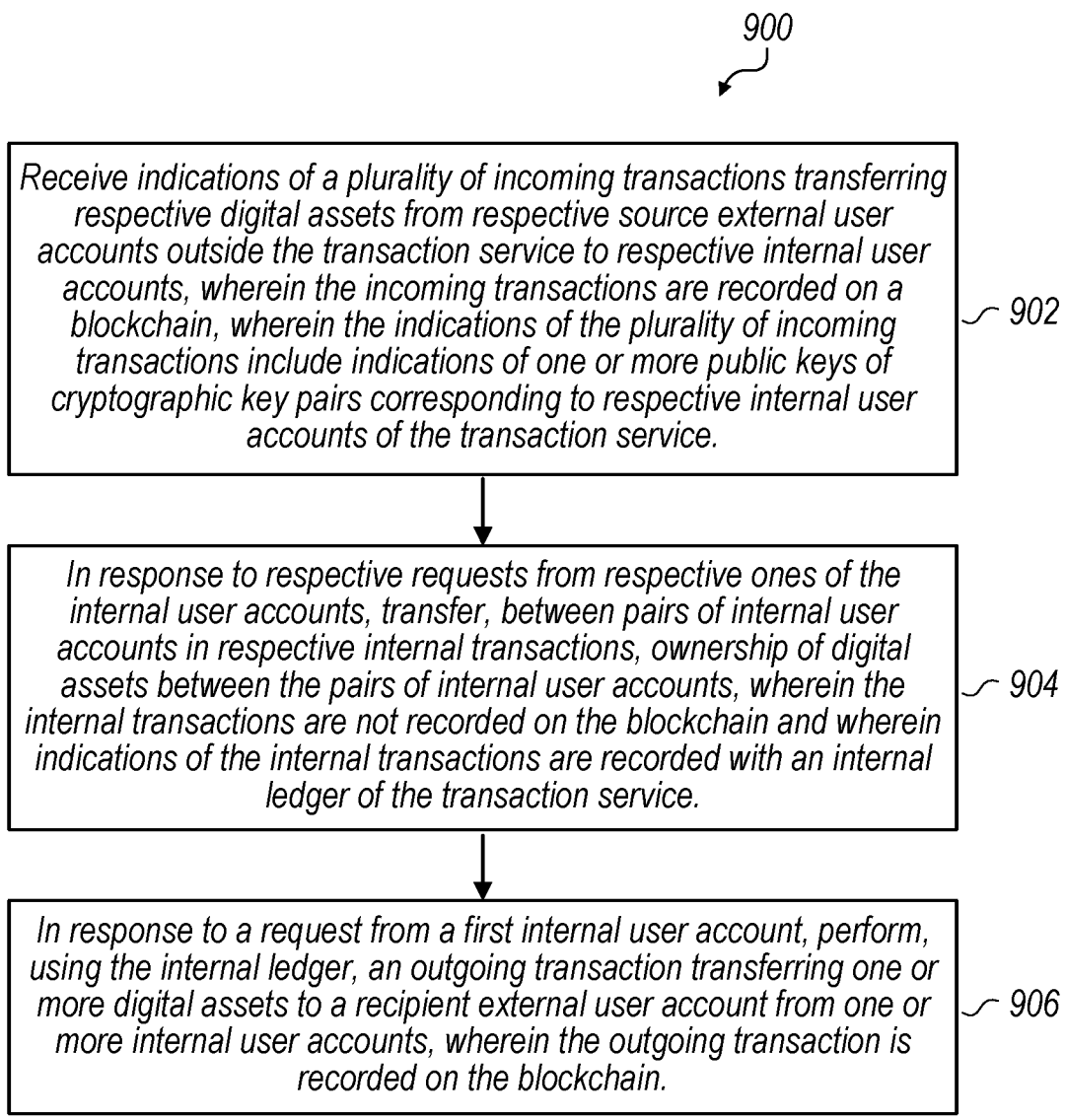
FIG. 9 is flowchart illustrating an embodiment of a transaction facilitation method in accordance with the disclosed embodiments.

FIGS. 8 and 9 illustrate various flowcharts representing various disclosed methods implemented with computer system 150. Referring now to FIG. 8, a flowchart depicting a transaction facilitation method 800 is depicted. In the embodiment shown in FIG. 8, the various actions associated with method 800 are implemented by computer system 150, but one or more aspects of method 800 may be performed by another computer system according to various embodiments. Alternatively or additionally, some or all of the steps of the method 800 may be performed by one or more other computing devices. Steps of the method 800 may be modified, omitted, and/or performed in other orders, and/or other steps added.

At block 802, computer system 150 accesses, for accounts for respective first and second internal users 102 and 104, of a transaction service 160 provided by the computer system 150, first and second cryptographic key pairs (e.g., pairs of cryptographic keys 600). The first and second cryptographic key pairs are useable to authenticate transactions for recordation on a blockchain (e.g., recording using blockchain networks 130). At block 804, computer system 150 stores private keys of the first and second cryptographic key pairs such that owners of the first and second internal user accounts cannot access the private keys. At block 806, computer system 150 receives an indication of a first incoming transaction (e.g., incoming external transaction 702) transferring a first digital asset from outside the transaction service 160 to the first internal user account (e.g., the account of first internal user 102). The first incoming transaction is recorded on the blockchain (e.g., as a result of broadcasting transaction 712). The indication of the first incoming transaction includes an indication of a public key of the first cryptographic key pair. At block 806, computer system 150 transfers in a first internal transaction (e.g., internal transaction 704, internal transaction 720), in response to a request from the first internal user account, ownership of a portion of the first digital asset from the first internal user account to the second internal user account (e.g., the account of second internal user 104, the account of fourth internal user 732) without performing a cryptographic operation using the private key of the first cryptographic key pair to cause recordation of the transfer on the blockchain. The transferring is recorded using an internal ledger 156 of the transaction service 160 (e.g., recorded as a transaction entry 620).

Referring now to FIG. 9, a flowchart depicting a transaction facilitation method 900 is depicted. In the embodiment shown in FIG. 9, the various actions associated with method 900 are implemented by computer system 150, but one or more aspects of method 900 may be performed by another computer system according to various embodiments. Alternatively or additionally, some or all of the steps of the method 900 may be performed by one or more other computing devices. Steps of the method 900 may be modified, omitted, and/or performed in other orders, and/or other steps added. At block 902, computer system 150 receives indications of a plurality of incoming transactions (e.g., incoming external transaction 702) transferring respective digital assets from respective source external user accounts outside the transaction service 160 to respective internal user accounts (e.g., the account for first internal user account 102, the account for third internal user 730, the account for fourth internal user 732). The incoming transactions are recorded on a blockchain. The indications of the plurality of incoming transactions include indications of one or more public keys of cryptographic key pairs (e.g., cryptographic keys 600) corresponding to respective internal user accounts of the transaction service 160. At block 904, in response to respective requests from respective ones of the internal user accounts, transferring, with the computer system between pairs of internal user accounts in respective internal transactions (e.g., internal transactions 704, 702, 722, 724, 726), ownership of digital assets between the pairs of internal user accounts. The internal transactions are not recorded on the blockchain. The internal transactions are recorded with an internal ledger 156 of the transaction service 160 (e.g., recorded as transaction entries 620). At block 906, in response to a request from a particular internal user account (e.g., a request from second internal user 104), performing, with the computer system 150 using the internal ledger 156, an outgoing transaction (e.g., outgoing external transaction 706) transferring one or more digital assets to a recipient external user account (e.g., the account of second external user 108) from one or more internal user accounts. The outgoing transaction is recorded on the blockchain. In various embodiments, in method 900 the owners of respective ones of the internal user accounts are only able to access the internal user accounts through the transaction service 160.

Blockchain Terminology

Securing Keys

As discussed herein, for internal users (e.g., first internal user 102, second internal user 104), transaction service 160 is operable to manage and secure the cryptographic keys 600). In various embodiments, internal users are not able to access the private key corresponding to their account and must use transaction service 160 to perform transactions that are recorded on a blockchain. For external users (e.g., first external user 106, second external user 108), private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access a user's public/private keys may access the user's assets. While the assets may be recorded on the blockchain, the user may not be able to access them without the private key.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, ticket, or any other asset that may be represented in digital form. For example, a token may refer to an entry related to cryptocurrency that is used for a specific purpose or may represent ownership of a real-world asset, such as Fiat currency or real-estate. Token contracts refer to cryptographic tokens that represent a smart contract that maintain a set of rules and user balances of a particular token. The person that owns the private key corresponding to the blockchain address may access the tokens at the address. Thus, the blockchain address may represent an identity of the person that owns the tokens. Only the owner of the blockchain address may send the token to another person. The tokens may be accessible to the owner via the owner's wallet. The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

Establishing User Identity

While a digital signature may provide a link between a transaction and an owner of assets being transferred, it may not provide a link to the real identity of the owner. In some cases, the real identity of the owner of the public key corresponding to the digital signature may need to be established (e.g., established by transaction service 160 prior to granting access to an internal user account). The real identity of an owner of a public key may be verified, for example, based on biometric data, passwords, personal information, etc. Biometric data may comprise any physically identifying information such as fingerprints, face and eye images, voice sample, DNA, human movement, gestures, gait, expressions, heart rate characteristics, temperature, etc.

Publishing and Validating a Block

As discussed above, full nodes 205 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 205 solves the puzzle, it may publish its block to be validated by the validation nodes 205 of the blockchain network 130.

In a proof of work consensus model, a node validates a transaction, for example, by running a check or search through the current ledger stored in the blockchain. The node will create a new block for the blockchain that will include the data for one or more validated transactions (see, e.g., block 375 of FIG. 3). In a blockchain implementation such as Bitcoin, the size of a block is constrained. Referring back to FIG. 3, in this example, the block will include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is less than a preset value. This is achieved through addition of a data value referred to as a nonce 360. Because final hash values cannot be predicted based on its input, it is not possible to estimate an appropriate value for the nonce 360 that will result in a final hash value that is less than the pre-set value. Accordingly, in this embodiment, a computationally-intensive operation is needed at the node to determine an appropriate nonce value through a "brute force" trial-and-error method. Once a successful nonce value is determined, the completed block is published to the blockchain network for validation. If validated by a majority of the nodes in the block chain network, the completed block is added to the blockchain at each participating node. When a node's block is not added to the blockchain, the block is discarded and the node proceeds to build a new block. The transactions that were in the discarded block may be returned to a queue and wait to be added to a next block. When a transaction is discarded or returned to the queue, the assets associated with the discarded transaction are not lost, since a record of the assets will exist in the blockchain. However, when a transaction is returned to the queue it causes a delay in completing the transaction. Reducing the time to complete a transaction may be important. A set of blockchain rules, or renumeration/compensation for a node to process the returned transaction may determine how a returned transaction is to be treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcast to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, a blockchain network may determine which of the full nodes 205 publishes a next block to the blockchain. In a permissionless blockchain network, the nodes 205 may compete to determine which one publishes the next block. A node 205 may be selected to publish its block as the next block in the blockchain based on consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g., the mathematical puzzle described above). The solution serves as "proof" that the node expended an appropriate amount of effort in order to publish the block. The solution may be validated by the full nodes before the block is accepted. The proof of work model, however, may be vulnerable to a 51% attack described below. The proof of stake model is generally less computationally intensive that the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g., in the context of a corporate environment), a hybrid blockchain network may switch to be between completely or partially permissioned and permissionless. The network may switch based on various factors, such as latency, security, market conditions, etc.

Forks

As discussed above, consensus models may be utilized for determining an order of events on a blockchain, such as which node gets to add the next block and which node's transaction gets verified first. When there is a conflict related to the ordering of events, the result may be a fork in the blockchain. A fork may cause two versions of the blockchain to exist simultaneously. Consensus methods generally resolve conflicts related to the ordering of events and thus, prevent forks from occurring. In some cases, a fork may be unavoidable. For example, with a proof of work consensus model, only one of the nodes competing to solve a puzzle may win by solving its puzzle first. The winning node's block is then validated by the network. If the winning node's block is successfully validated by the network, then it will be the next block added to the blockchain. However, it may be the case that two nodes may end up solving their respective puzzles at the same time. In such a scenario, the blocks of both winning nodes may be broadcast to the network. Since different nodes may receive notifications of a different winning node, the nodes that receive notification of the first node as the winning node may add the first node's block to their copy of the blockchain. Nodes that receive notification of the second node as the winning node may add the second node's block to their copy of the blockchain. This results in two versions of the blockchain or a fork. This type of fork may be resolved by the longest chain rule of the proof of work consensus model. According to the longest chain rule, if two versions of the blockchain exist, then the network the chain with a larger number of blocks may be considered to be the valid blockchain. The other version of the blockchain may be considered as invalid and discarded or orphaned. Since the blocks created by different nodes may include different transactions, a fork may result in a transaction being included in one version of the blockchain and not the other. The transactions that are in a block of a discarded blockchain may be returned to a queue and wait to be added to a next block.

In some cases, forks may result from changes related to the blockchain implementation, for example, changes to the blockchain protocols and/or software. Forks may be more disruptive for permissionless and globally distributed blockchain networks than for private blockchain networks due to their impact on a larger number of users. A change or update to the blockchain implementation that is backwards compatible may result in a soft fork. When there is a soft fork, some nodes may execute the update blockchain implementation while other nodes may not. However, nodes that do not update to the new blockchain implementation may continue to transact with updated nodes.

A change to the blockchain implementation that is not backwards compatible may result in a hard fork. While hard forks are generally intentional, they may also be caused by unintentional software bugs/errors. In such a case, all publishing nodes in the network may need to update to the new blockchain implementation. While publishing nodes that do not update to the new blockchain implementation may continue to publish blocks according to the previous blockchain implementation, these publishing nodes may reject blocks created based on the new blockchain implementation and continue to accept blocks created based on the previous blockchain implementation. Therefore, nodes on different hard fork versions of the blockchain may not be able to interact with one another. If all nodes move to the new blockchain implementation, then the previous version may be discarded or abandoned. However, it may not be practical or feasible to update all nodes in the network to a new blockchain implementation, for example, if the update invalidates specialized hardware utilized by some nodes.

Quantum Computing

One of the concerns of quantum computing is that it may increase the probability of breaking cryptographic algorithms and thus, weaken overall security for the blockchain. This may be addressed by requiring larger key sizes for blockchain asymmetric-key pairs of cryptographic algorithms. In some cases, if there is a concern that a block may be decrypted in the future, a dynamically changing cryptographic hash may be utilized. A different cryptographic hash may be dynamically selected for a particular block or the entire blockchain based on various factors, such as whether there is a concern that the block will be decrypted in the future, increasing a strength of the hash, utilizing a hash that is better suited for protecting privacy. In some cases, different cryptographic hashes may be selected for different blocks.

Anonymity and Privacy

As discussed above, the use of a private/public key pair to establish user authenticity during validation of a blockchain transaction provides some privacy as it does not reveal user identity. However, the transactions stored on a blockchain may be visible to the public. It has been shown that user identity may be derived from the publicly available transaction information.

Blockchain Size

Depending on a frequency at which events are recorded in a blockchain, the size of the blockchain may grow quickly. Computing/storage capacity (i.e., faster processors, larger storage components) may be needed to support the expansion of the blockchain. In some cases, blocks may be compressed prior to being added to the chain. In some cases, blocks may be eliminated, for example, at the beginning of the blockchain, when they become stale or irrelevant. As an example, a method for "replacing" the first 1000 transactions with a new block that effectively mimics the hash of the 1000 transactions may be useful for managing blockchain size.

Blockchain Immutability

In some cases, content in a blockchain may need to be deleted. For example, content may need to be deleted if there is a security breach or if the content is no longer relevant. A level of immutability of a blockchain may depend on a type of the blockchain. For example, changing content may be difficult in a public blockchain due to its possible impact on a large number of users. According to some techniques, data stored in a private blockchain, or a public blockchain controlled by a few entities may be changed by recording a flag (current block) where the change is being made, and adding the current block (referred to by the flag) to the blockchain. The added block may then indicate the change made to the previous block.

As another example, a blockchain may need to be changed to resolve a broken link. For example, the hash of a changed block may no longer match the hash stored in the block+1. In some cases, the blockchain may need to be changed in order to reverse the results of illegal transactions. In some cases, the blockchain may need to be changed to address software errors, erroneous transactions, or remove information that is confidential or required by law to be removed. If the blockchain is immutable, these errors and information may be permanently embedded in the blockchain. Additionally, the blockchain may need to be changed to comply with regulatory concerns, such as the European Union's incoming General Data Protection Regulation (GDPR), or California Consumer Privacy Act (CCPA), regarding consumer data privacy and ownership rights, US Fair Credit Reporting Act, and the SEC's "Regulation SP," which require that recorded user identifiable personal financial data be redactable.

Some techniques may allow modifications to the blockchain to address software errors, legal and regulatory requirements, etc., by allowing designated authorities to edit, rewrite or remove previous blocks of information without breaking the blockchain. Such techniques may enable blockchain editing by using a variation of a "chameleon" hash function, through the use of secure private keys. This editing may allow smart contracts that were flawed at issue to be updated so that the changes carry over to subsequent smart contracts in the blockchain. Using these techniques, blocks that have been changed may be using a "scar" or mark that cannot be removed, even by trusted parties.

According to some techniques, when a block is hashed, any confidential information, such as personally identifiable information, and IP addresses, is not included in the hash because it is not part of the data values that were hashed. But because there is no hash of the confidential information, it may be changed. According to some techniques, the confidential information may not be placed or recorded into the blockchain. Rather the information may reside in a file that is external to the blockchain. A hash of that file, however, may be recorded in the blockchain. For example, a user's confidential information may be deleted locally without affecting the blockchain.

As another example, assuming that all content included in a block in a blockchain cannot be changed after a block is added to the blockchain, a determination may be made before adding data to the blockchain of whether some or all of that data may need to be deleted at a later time. For example, confidential information (i.e., data to be deleted at a later time) may be stored as a file that is external to the block and the blockchain. For the purposes of creating the block, a link to the file containing the confidential information and a hash of the file containing the confidential information file may be added to the block. An example of a link would be an HTTP link. During confirmation of the block that is to be added to the blockchain, the network nodes may be able to access the confidential information and verify that the confidential information based on the hash value of the file in the block. Because the hash value of the file is a part of the block, the file containing the confidential information may not be easily changed. However, it may be possible to change the confidential information file by changing the data therein and adding a nonce. This may seek to change the nonce until the resulting hash equals the hash that is stored in the blockchain. However, this would be difficult (probably near impossible), and an inspection of the modified confidential information file would reveal the added nonce, which may then raise suspicion that information was changed since it was first added to the blockchain.

Files containing confidential information may be encrypted (e.g., through an asymmetric key encryption function) prior to the hashing operation. When "deleting" the confidential information, the file containing the confidential information may be deleted or removed resulting in the link, which is stored in the blockchain, being ineffective for retrieving the file. The hash of the file, and the link, remain in the blockchain so that the linking of the blocks through hash functions is not affected. However, because of this change, a transaction that is part of the block or part of a different special block could be added to the blockchain to indicate that the link is no longer effective and the confidential information file is no longer part of the blockchain. This may effectively keep confidential information out of the blockchain while providing the confidential information to users of the blockchain and proof of authenticity of the confidential information before it is deleted from the blockchain. This may come with drawbacks because access to data implies that such data may be stored. Accordingly, those with access to the confidential information file, while it was part of the blockchain, may have stored that information in another location that may no longer be reachable during the "deleting" operation discussed above.

51% Attack

A "51% attack" refers to an individual mining node or a group of mining nodes controlling more than 50% of a blockchain network's mining power, also known as hash rate or hash power. The hash rate is a measure of the rate at which hashes are being computed on the blockchain network. As described above, hashing may include taking an input string of a given length, and running it through a cryptographic hash function in order to produce an output of a fixed length. A blockchain network's hash rate may be expressed in terms of 1 (kilohash per second) which is 1,000 hashes per second, 1 MH/s (megahash per second) which is 1,000,000 hashes per second, 1 TH/s (terahash per second) which is 1,000,000,000.000 hashes per second, or 1 PH/s (petahash per second) which is 1,000,000,000,000,000 hashes per second. As an example, a mining node in a blockchain utilizing a proof of work consensus model (PoW) may perform hashing in order to find a solution to a difficult mathematical problem. The hash rate of the mining node may depend on the computational resources available to that node. A mining node that successfully solves the mathematical problem may be able to add a block to the blockchain. Thus, by ensuring that invalid transactions cannot be included in a block, mining nodes increase the reliability of the network. Transactions may be deemed invalid if they attempt to spend more money, than is currently owned or engage in double-spending. If a mining node intentionally or unintentionally includes an invalid transaction in a block, then the block will not be validated by the network. Additionally, nodes that accept the invalid block as valid and proceed to add blocks on top of the invalid block will also end up wasting computational resources. Thus, mining nodes are discouraged from cheating by intentionally adding invalid transactions to blocks and accepting invalid blocks as valid.

Figure 11A:
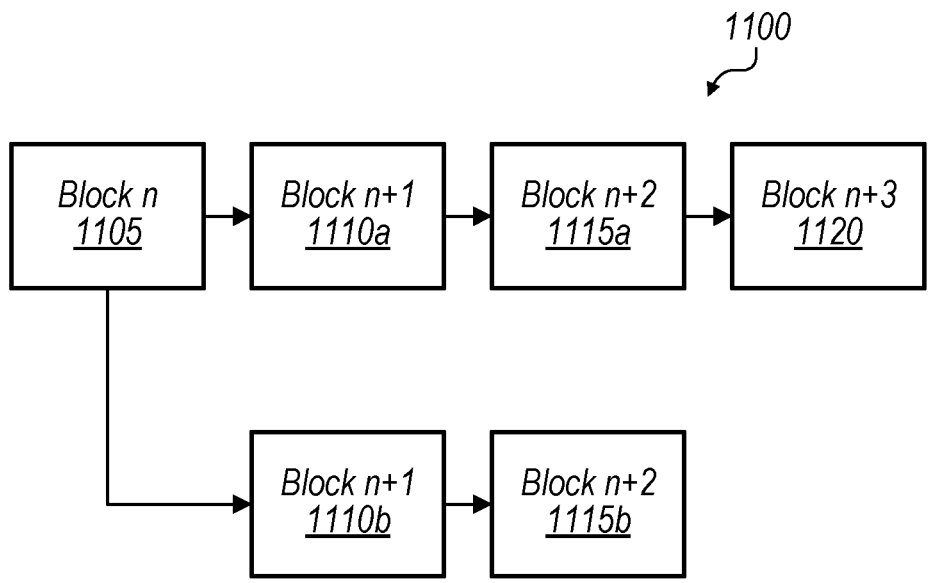
FIG. 11A shows an example of a privately broadcasted blockchain.

An entity may be able to disrupt the network by gaining control of 50% of a network's hash rate. In a 51% attack, a blockchain node may intentionally reverse or overwrite transactions and engage in double-spending. When a node generates a valid block of transactions, it broadcasts the block to the network for validation. In some cases, a node controlling more than 50% of a network's hash rate may mine blocks in private without broadcasting them to the network. In such a scenario, the rest of the network may follow a public version of the blockchain while the controlling node may be following its private version of the blockchain. FIG. 11A shows a fraudulent and valid version of a blockchain. The valid blockchain on the top comprises the valid blocks 1105, 1110*a*, 1115*a*, and 1120. The fraudulent blockchain on the bottom is not broadcast to the network and includes the blocks 1105, 1110*b*, 1115*b*, and an invalid block 1120.

Figure 11B:
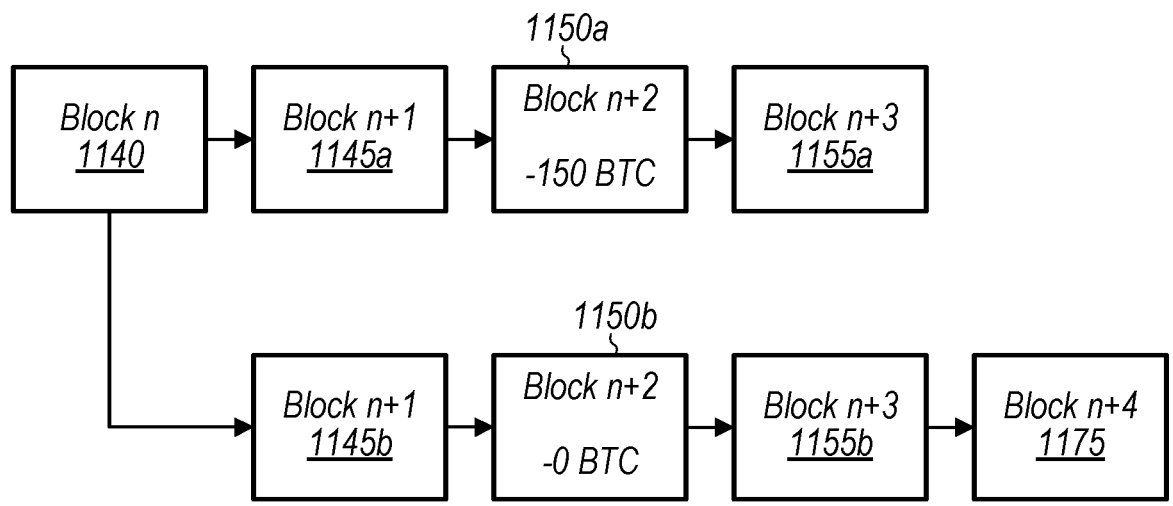
FIG. 11B shows an example of blockchain misuse.

FIG. 11B shows another fraudulent and valid version of a blockchain. The valid version of the blockchain includes nodes 1140, 1145*a*, 1150*a*, and 1155*a*. The fraudulent version of the blockchain includes nodes 1140, 1145*b*, 1150*b*, 1155*b*, and 1175. However, following the longest chain rule, the network may select and utilize the private or fraudulent blockchain comprising nodes 1140, 1145*b*, 1150*b*, 1155*b* and 1175. Since it is the longest chain, previous transactions may be updated according to this chain. The cheating node may include transactions that spend money, such as the node 1150*b* including the transaction for 150 BTC, on the public or fraudulent version of the blockchain without including these transactions in the private version of the blockchain. Thus, in the private version of the blockchain, the cheating node may continue to own the spent 150 BTC. When the cheating node controls more than 50% of the hashing resources of the network, it may able to broadcast its private version of the blockchain and continue to create blocks on the private blockchain faster than the rest of the network, thus, resulting in a longer blockchain. Since there are two versions of the blockchain, the network may select the longest or fraudulent private blockchain as the valid blockchain. As a result, the rest of the network may be forced to use the longer blockchain. The public or valid version of the blockchain may then be discarded or abandoned and all transactions in this blockchain that are not also in the private or fraudulent version of the blockchain may be reversed. The controlling or cheating node may continue to own the spent money because the spending transactions are not included on the fraudulent version of the blockchain, and the cheating node may therefore, spend that money in future transactions.

Because of the financial resources needed to obtain more hashing power than the rest of the entire network combined, a successful 51% attack may generally be challenging to achieve. However, it would be less expensive to achieve a 51% attack on a network with a lower hash rate than one with a higher has rate. Additionally, the probability of a successful 51% attack increases with the use of mining pools in which multiple nodes may combine their computational resources, for example, when mining is performed from the same mempool.

Applications Employing Blockchain

Blockchain Based Application: Cryptocurrency

Cryptocurrency is a medium of exchange that may be created and stored electronically in a blockchain, such as a the blockchain network 130*a* in FIG. 1. Bitcoin is one example of cryptocurrency, however there are several other cryptocurrencies. Various encryption techniques may be used for creating the units of cryptocurrency and verifying transactions. As an example, the first external user 106 may own 10 units of a cryptocurrency. The blockchain network 130*a* may include a record indicating that the first external user 106 owns the 10 units of cryptocurrency. The first external user 106 may initiate a transfer of the 10 units of cryptocurrency to the second external user 108 via a wallet application executing on the first external client device 124. The wallet application may store and manage a private key of the first external user 106. Examples of the wallet device include a personal computer, a laptop computer, a smartphone, a personal data assistant (PDA), etc. In various embodiments, discussed herein, transaction service 160 provided by computer system 150 manages the cryptographic key pairs for the various internal users of the transaction service (e.g., first internal user 102, second internal user 104). In such embodiments, the cryptographic module 158 of transaction service 160 performs the tasks below that are performed by the wallet application running on first external client device 124 and/or second external client device 126.

Figure 10A:
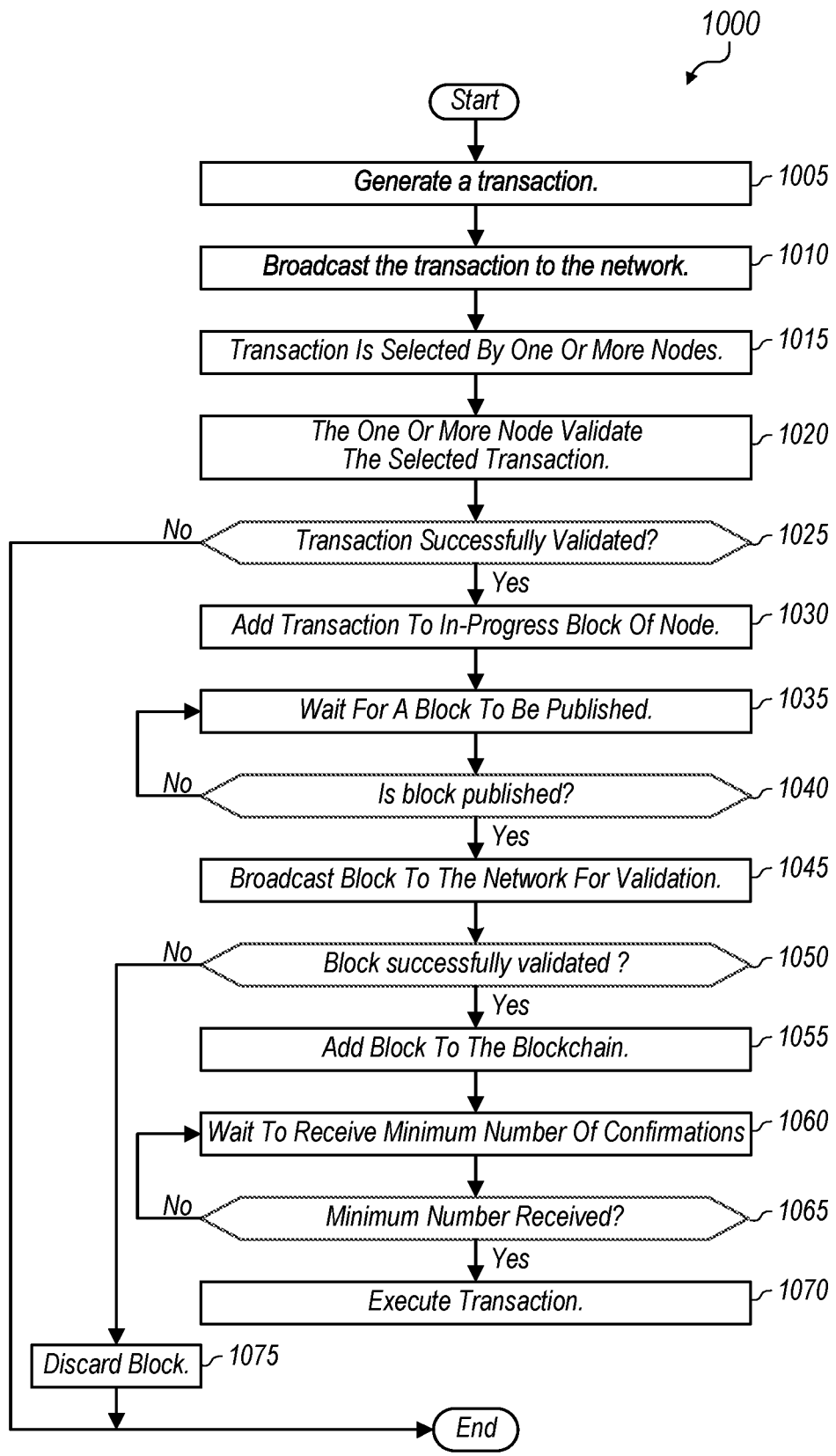
FIG. 10A is a flow diagram showing steps of an example method for performing a blockchain based transaction.

FIG. 10A is a flow diagram showing steps of an example method 1000 for performing a blockchain transaction between entities, such as the first external user 106 of the first external client device 124 and the second external user 108 of the second external client device 126 in FIG. 1. The steps of the method 1000 may be performed by any of the computing devices shown in FIG. 1, but one or more aspects of method 1000 may be performed by another computer system according to various embodiments. Alternatively or additionally, some or all of the steps of the method 1000 may be performed by one or more other computing devices. Steps of the method 1000 may be modified, omitted, and/or performed in other orders, and/or other steps added.

While the steps of method 1000 are discussed in reference to transactions conducted between users that are external to the transaction service 160 discussed herein, it will be understood that in instances where the transaction service 160 is facilitating an incoming external transaction (e.g., incoming external transaction 702 shown in FIGS. 7A and 7B) or an outgoing external transaction (e.g., outgoing external transaction 706 shown in FIGS. 7A and 7B), the various respective tasks performed by first external client device 124 and second external client device 126 are performed by transaction service 160 as discussed herein. For example, tasks performed by a wallet application of first external client device 124 would instead be performed by cryptographic module 158 and external transaction module 154. In various embodiments, transaction service 160 also performs the tasks performed by the "third computer system" discussed in reference to method 1000. Thus, in various embodiments, transaction service 160 generates the transaction data, broadcasts it to the blockchain network 130a, receives the blockchain confirmations, and transfers the cryptocurrency as discussed herein. Additionally, in various embodiments, computer system 150 may facilitate transactions between external users (e.g., first external user 106, second external user 108) in addition to facilitating transactions between external users and internal users (e.g., first internal user 102, second internal user 104) and between internal users. Such transactions may be facilitated by transaction service 160 or by another process implemented on computer system 150.

At step 1005, the wallet application may generate transaction data for transferring the 10 units of cryptocurrency from the first external user 106 to the second external user 108. The wallet application may generate a public key for the transaction using the private key of the first external user 106. In order to indicate that the first external user 106 is the originator of the transaction, a digital signature may also be generated for the transaction using the private key of the first external user 106. As discussed with reference to FIG. 4, the transaction data may include information, such as a blockchain address of the sender 430, the digital signature 455, transaction output information 460, and the public key 415 of the sender. In various embodiments, the transaction data may be sent to a third computer system such as computer system 150 or another transaction server from the first client device 125.

The third computer system (e.g., computer system 150, another transaction server) may receive the transaction data from the first client device 125. At step 1010, the third computer system (e.g., computer system 150, another transaction server) may broadcast the transaction to the blockchain network 130a. The transaction may be received by one or more nodes 205 of the blockchain network 130a. At step 1015, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 1020, each of the nodes 205 that selected the transaction may validate the transaction. Validating the transaction may include determining whether the transaction is legal or conforms to a pre-defined set of rules for that transaction, establishing user authenticity, and establishing transaction data integrity. At step 1025, if the transaction is successfully validated by a node 205, the validated transaction is added to a block being constructed by that node 205. As discussed above, since different nodes 205 may choose to validate different transactions, different nodes 205 may build or assemble a block comprising different validated transactions. Thus, the transaction associated with the first external user 106 transferring 10 units of cryptocurrency to the second external user 108 may be included in some blocks and not others.

At step 1035, the blockchain network 130a may wait for a block to be published. Validated transactions may be added to the block being assembled by a node 205 until it reaches a minimum size specified by the blockchain. If the blockchain network 130a utilizes a proof of work consensus model, then the nodes 205 may compete for the right to add their respective blocks to the blockchain by solving a complex mathematical puzzle. The node 205 that solves its puzzle first wins the right to publish its block. As compensation, the winning node may be awarded a transaction fee associated with the transaction (e.g., from the wallet of the first external user 106). Alternatively, or in addition, the winning node may be awarded compensation as an amount of cryptocurrency added to an account associated with the winning node from the blockchain network (e.g., "new" units of cryptocurrency entering circulation). This latter method of compensation and releasing new units of cryptocurrency into circulation is sometimes referred to as "mining." At step 1040, if a block has not been published, then the method 1000 returns to step 1035 and waits for a block to be published. However, at step 1040, if a block has been published, then the method 1000 proceeds to step 1045.

At step 1045, the published block is broadcast to the blockchain network 130a for validation. At step 1050, if the block is validated by a majority of the nodes 205, then at step 1055, the validated block is added to the blockchain 220. However, at step 1050, if the block is not validated by a majority of the nodes 205, then the method 1000 proceeds to step 1075. At step 1075, the block is discarded and the transactions in the discarded block are returned back to the queue. The transactions in the queue may be selected by one or more nodes 205 for the next block. The node 205 that built the discarded block may build a new next block.

At step 1060, if the transaction was added to the blockchain 220, the third computer system (e.g., computer system 150, another transaction server) may wait to receive a minimum number of blockchain confirmations for the transaction. At step 1065, if the minimum number of confirmations for the transaction have not been received, then the process may return to step 1060. However, if at step 1065, the minimum number of confirmations have been received, then the process proceeds to step 1070. At step 1070, the transaction may be executed and assets from the first external user 106 may be transferred to the second external user 108. For example, the 10 units of cryptocurrency owned by the first external user 106 may be transferred from a financial account of the first external user 106 to a financial account of the second external user 108 after the transaction receives at least three confirmations.

Smart Contracts

A smart contract is an agreement that is stored in a blockchain and automatically executed when the agreement's predetermined terms and conditions are met. The terms and conditions of the agreement may be visible to other users of the blockchain. When the pre-defined rules are satisfied, then the relevant code is automatically executed. The agreement may be written as a script using a programming language such as Java, C++, JavaScript, VBScript, PHP, Perl, Python, Ruby, ASP, Tcl, etc. The script may be uploaded to the blockchain as a transaction on the blockchain.

As an example, the first internal user 102 (also referred to as tenant) may rent an apartment from the second external user 108 (also referred to as landlord). A smart contract may be utilized between the tenant and the landlord for payment of the rent. The smart contract may indicate that the tenant agrees to pay next month's rent of $1000 by the 28$^{th}$ of the current month. The agreement may also indicate that if the tenant pays the rent, then the landlord provides the tenant with an electronic receipt and a digital entry key to the apartment. The agreement may also indicate that if the tenant pays the rent by the 28$^{th}$ of the current month, then on the last day of the current month, both the entry key and the rent are released respectively to the tenant and the landlord.

Figure 10B:
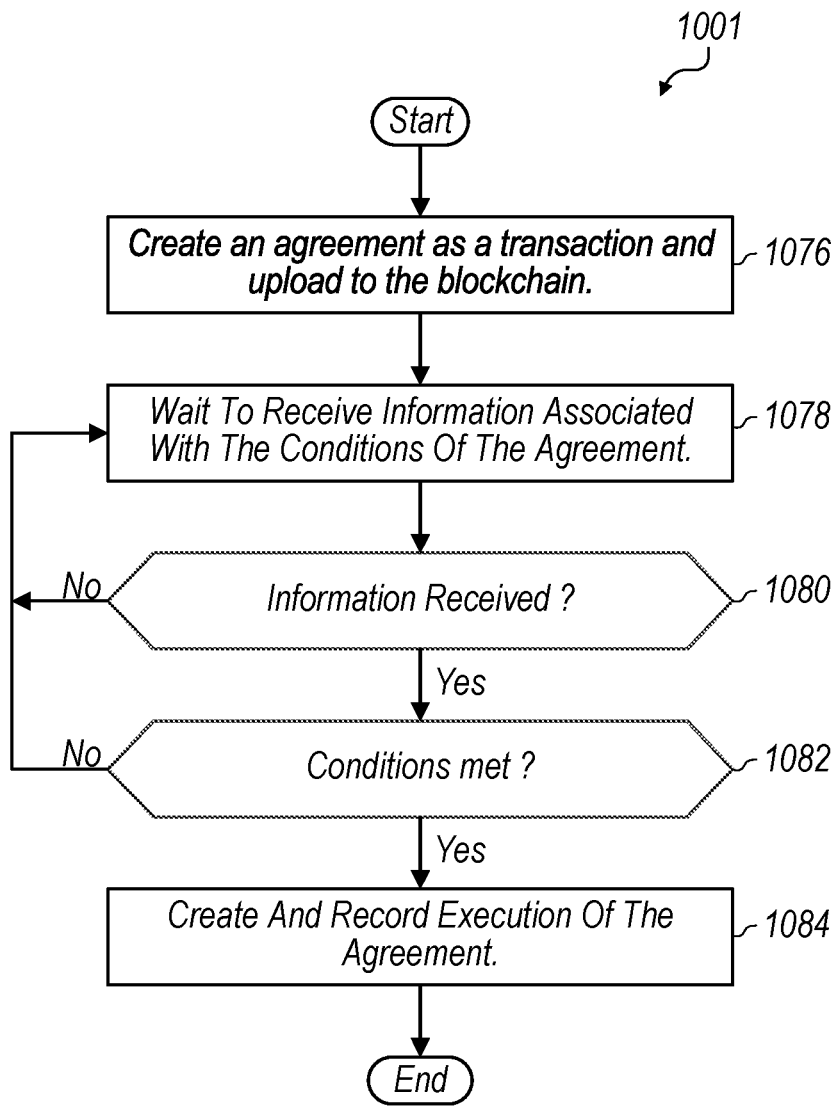
FIG. 10B is a flow diagram showing steps of an example method for performing a blockchain based transaction.

FIG. 10B is a flow diagram showing steps of an example method 1001 for performing a smart contract transaction between entities, such as the tenant and the landlord. The steps of the method 1001 may be performed by any of the computing devices shown in FIG. 1. Alternatively or additionally, some or all of the steps of the method 1001 may be performed by one or more other computing devices. Steps of the method 1001 may be modified, omitted, and/or performed in other orders, and/or other steps added.

At step 1076, the agreement or smart contract between the tenant and the landlord may be created and then submitted to the blockchain network 130a as a transaction. The transaction may be added to a block that is mined by the nodes 205 of the blockchain network 130a, the block comprising the transaction may be validated by the blockchain network 130a and then recorded in the blockchain 220 (as shown in steps 1010-1055 in FIG. 10A). The agreement associated with the transaction may be given a unique address for identification.

At step 1078, the method 1001 waits to receive information regarding the conditions relevant for the agreement. For example, the method 1001 may wait to receive notification that $1000 was sent from a blockchain address associated with the tenant and was received at a blockchain address associated with the landlord by the 28$^{th}$ of the current month. At step 1080, if such a notification is not received, then the method 1001 returns to step 1078. However, if at step 1080, a notification is received, then the method 1001 proceeds to step 1082.

At step 1082, based on determining that the received notification satisfies the conditions needed to trigger execution of the various terms of the smart contract, the method 1001 proceeds to step 1084. However, at step 1082, if it is determined that the received notification does not satisfy the conditions needed to trigger execution of the smart contract, then the method 1001 returns to step 1078. At step 1083, the method 1001 creates a transaction associated with execution of the smart contract. For example, the transaction may include information of the payment received, the date the payment was received, an identification of the tenant and an identification of the landlord. The transaction may be broadcast to the blockchain network 130a and recorded in the blockchain 220 (as shown in steps 1010-1055 of the method 1000 of FIG. 10A). If the transaction is successfully recorded in the blockchain 220, the transaction may be executed. For example, if the payment was received on the 28$^{th}$, then an electronic receipt may be generated and sent to the tenant. However, on the last day of the current month, both the digital entry key and the rent are released respectively to the tenant and the landlord.

Smart contracts may execute based on data received from entities that are not on the blockchain or off-chain resources. For example, a smart contract may be programmed to execute if a temperature reading from a smart sensor or IoT sensor falls below 10 degrees. Smart contracts are unable to pull data from off-chain resources. Instead, such data needs to be pushed to the smart contract. Additionally, even slight variations in data may be problematic since the smart contract is replicated across multiple nodes of the network. For example, a first node may receive a temperature reading of 9.8 degrees and a second node may receive a temperature reading of 10 degrees. Since validation of a transaction is based on consensus across nodes, even small variations in the received data may result in a condition of the smart contract to be evaluated as being not satisfied. Third party services may be utilized to retrieve off-chain resource information and push this to the blockchain. These third-party services may be referred to as oracles. Oracles may be software applications, such as a big data application, or hardware, such as an IoT or smart device. For example, an oracle service may evaluate received temperature readings beforehand to determine if the readings are below 10 degrees and then push this information to the smart contract. However, utilizing oracles may introduce another possible point of failure into the overall process. Oracles may experience errors, push incorrect information or may even go out of business.

Since blockchains are immutable, amending or updating a smart contract that resides in a blockchain may be challenging and thus, more expensive and/or more restrictive than with text-based contracts.

Internet of Things (IoT)

An IoT network may include devices and sensors that collect data and relay the data to each other via a gateway. The gateway may translate between the different protocols of the devices and sensors as well as manage and process the data. IoT devices may, for example, collect information from their environments such as motions, gestures, sounds, voices, biometric data, temperature, air quality, moisture, and light. The collected information sent over the Internet for further processing. Typically, IoT devices use a low power network, Bluetooth, Wi-Fi, or satellite to connect to the Internet or "the cloud". Some IoT related issues that blockchain may be able to detect include a lack of compliance in the manufacturing stage of an IoT device. For example, a blockchain may track whether an IoT device was adequately tested.

As discussed above, information from off-chain resources, including IoT devices, may be pushed to smart contracts via third party entities known as oracles. As an example, a smart refrigerator may monitor the use of an item stored in the refrigerator, such as milk. Various sensors within the refrigerator may be utilized for periodically determining an amount of milk stored in the refrigerator. A smart contract stored in a blockchain may indicate that if the weight of the stored milk falls below 10 ounces, then a new carton of milk is automatically purchased and delivered. The refrigerator sensors may periodically send their readings to a third-party service or oracle. The oracle may evaluate the sensor readings to determine whether the conditions for purchasing a new carton of milk have been met. Upon determining that the weight of the stored milk is below 10 ounces, the oracle may push information to the smart contract indicating that the condition for executing the smart contract has been met. The smart contract may execute and a new carton of milk may be automatically purchased. Both the execution of the smart contract and the purchase of the new carton may be recorded in the blockchain. In some cases, the condition may be an occurrence of an event, such as a need or anticipated need, or convenience factors, such as a delivery day, cost, promotions, or incentives.

Some issues related to the integration of blockchain into IoT include speed of transactions and computational complexity. The speed at which transactions are executed on the blockchain may be important when IoT networks with hundreds or thousands of connected devices are all functioning and transacting simultaneously. IoT devices are generally designed for connectivity rather than computation and therefore, may not have the processing power to support a blockchain consensus algorithm, such as proof of work. IoT devices also tend to be vulnerable to hacking via the Internet and/or physical tampering. For example, IoT devices may be more vulnerable to DDoS and malware attacks. Hackers may target a specific network and begin spamming the network with traffic within a short amount of time. Because of the increased surge in traffic, the bandwidth may be quickly overloaded, and the entire system may crash.

Supply Chain Monitoring and Logistics

A supply chain for a product may include a network of entities and activities that are involved in the creation of the product and its eventual sale to a customer. A blockchain based record of the supply chain for a product may be utilized, for example, to trace the provenance of parts and materials and to prevent counterfeit parts from entering the supply chain. Blockchain integration into the supply chain for a product may utilize IoT devices and data, oracles, and smart contracts. For example, an RFID tag may be attached to a product in order to physically track the product and record its location within the supply chain. Additionally, smart contracts may be utilized to record the various activities and interactions between entities that are involved in the product's supply chain. As discussed above with reference to FIGS. 10A and 10B, any data or information that may be digitally represented and electronically stored may be recorded in a blockchain by submitting the data as part of a blockchain transaction. When the transaction is included in a validated block that is added to the blockchain, the transaction and its associated data is recorded in the blockchain.

As an example, a permissioned blockchain may be utilized for recording and monitoring the entities and activities involved in food distribution, such as fruit or vegetables. The blockchain may be accessible to entities, such as the suppliers of seed and pesticides, farmers, distributors, grocery stores, customers, and regulators. The blockchain may record activities such as the sale of a pesticide and/or seed to the farmer, the harvesting and packaging of the fruit, its shipment to distributors' warehouses, its arrival at various stores, and eventual purchase by a consumer. Sensors and RFID devices may be utilized for tracking the fruit through the supply chain. For example, the fruit may be packaged in crates tagged with a unique RFID device. When the tagged crate is loaded onto a truck for shipment from the farm to a distributor, the crate may be scanned and a record of its shipment may be uploaded to the blockchain. When the crate arrives at a warehouse, it may be scanned again and a record of its arrival at the warehouse may be uploaded to the blockchain. Additionally, smart contracts may be executed throughout the supply chain. For example, when the crate is scanned at the warehouse, a smart contract between the farmer and the warehouse may be executed indicating that the crate was successfully shipped from the farmer to the warehouse and received by the warehouse.

As another example, a permissioned blockchain for an automobile may store a record of entities and activities related to a component that is utilized in the manufacturing of the automobile. The blockchain may be accessible to various entities, such as automobile OEMs, distributors and suppliers of materials and components, dealerships, mechanics, insurance providers, and others. While evaluating an accident involving a policy holder's automobile, an insurance provider may determine that the accident may have been caused by a defective component used in a wheel of the automobile. The insurance provider may wish to trace a provenance of the component based on information recorded in the permissioned blockchain. The insurance provider may query the blockchain data for information related to the component via, for example, a blockchain querying application executing on the first external client device 124. The query may include identifying information associated with the component. For example, the component may be marked with an identification that is unique to the component or a group of components. The results of the query may include records in the blockchain of the entities and activities that were involved in the creation of the component and its eventual sale to the automobile manufacturer.

Blockchain Enabled In-Store Purchasing

Figure 12:
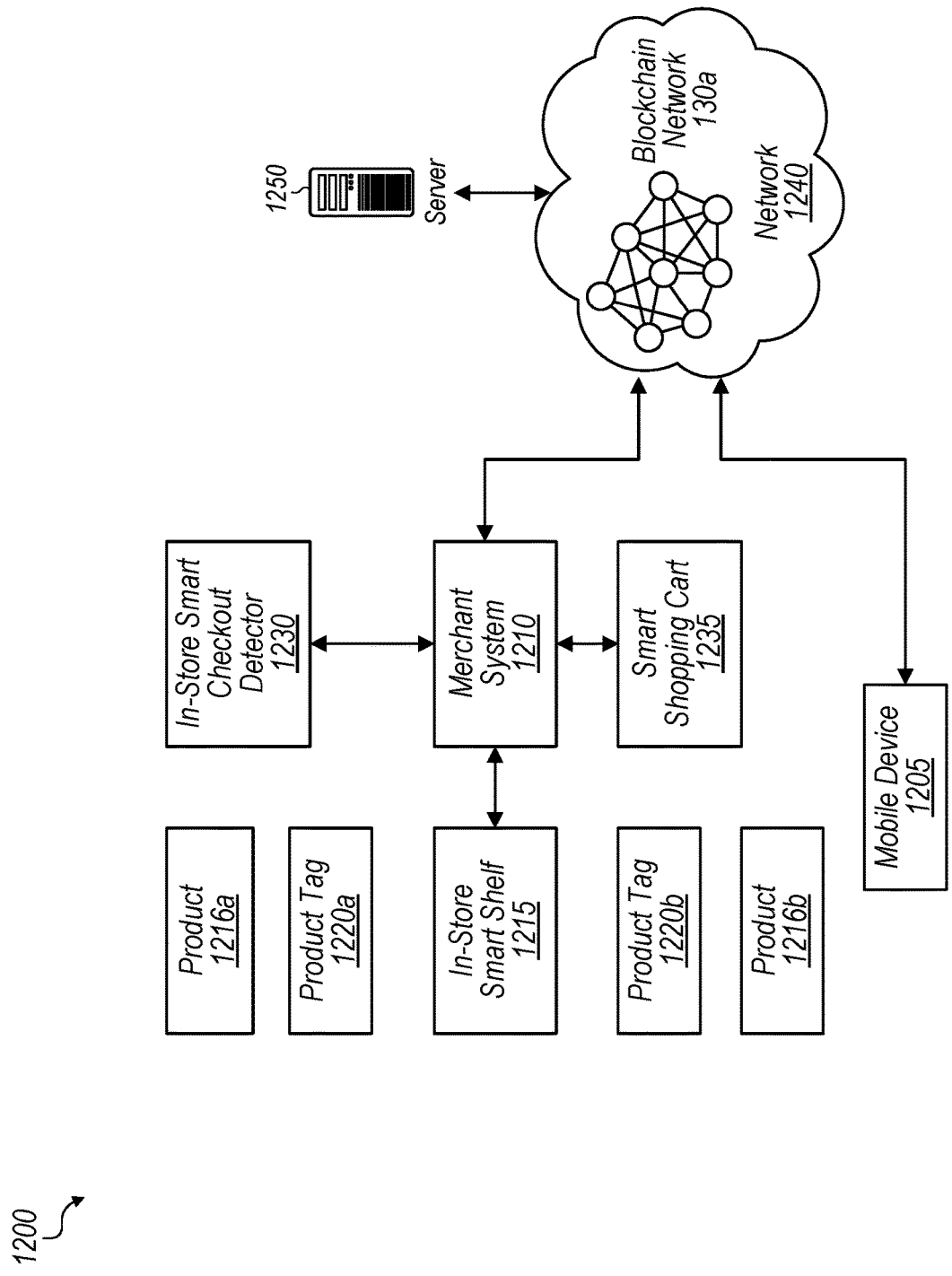
FIG. 12 illustrates an example of a blockchain enabled in-store purchase system.

An example of blockchain enabled in-store purchasing is described with reference to the system 1200 shown in FIG. 12, the method 1000 shown in FIG. 10A and the method 1001 shown in FIG. 10B. FIG. 12 illustrates an example of a blockchain enabled in-store purchase system 1200. The system 1200 includes a mobile device 1205, a merchant system 1210, and a server 850 connected via a network 1240. The merchant system 1210 may be connected via a local wireless network to various IoT devices within a store, for example, an in-store smart shelf 1215, and an in-store smart checkout detector 1230. Various components of system 1300 are configured to communicate over a network 1240 and interface with one or more blockchain networks (e.g., blockchain network 130*a*). In various embodiments, network 1240 includes the Internet.

The store may include one or more smart shelves, such as the in-store smart shelf 1215. The smart shelf 1215 may include an RFID tag, an RFID reader, and an antenna. One or more products may be stored on the in-store smart shelf 1215. Each product may include an RFID tag, such as a first product tag 1220*a* attached to a first product 1216*a* and a second product tag 1220*b* attached to a second product 1216*b*. The in-store smart shelf 1215 may, based on reading the product tags 1220*a* and 1220*b*, send information about the products 1216*a* and 1216*b* throughout the day to the merchant system 1210. The merchant system 1210 may in turn update an inventory of products currently within the store.

A shopper may travel through the store with the mobile device 1205. A digital shopping list on the mobile device 1205 may include a list of items that the shopper may need to purchase. For example, the shopping list may include an item that matches the first product 1216a. When the shopper is close to the in-store smart shelf 1215, the mobile device 1205 may notify the shopper that the first product 1216a is currently available on the in-store smart shelf 1215. The shopper may remove the first product 1216a from the in-store smart shelf 1215 and place it into a smart shopping cart 1235. The smart shopping cart 1235 may read the first product tag 1220a as well as the product tags attached to other products that may have been placed in the smart shopping cart 1235. When the shopper is ready to checkout, the shopper may walk out of the store with the shopping cart 1235. As the shopper walks out of the store, the in-store smart checkout detector 1230 may detect the smart shopping cart 1235. The smart shopping cart 1235 may communicate with the in-store smart checkout detector 1230 and transmit information about the products in the smart shopping cart. The in-store smart checkout detector 1230 may send information about the products, such as the first product 1216a, and payment information from the mobile device 1205 to the merchant system 1210. The merchant system 1210 may receive information from the in-store smart checkout detector 1230 and the payment information and proceed to initiate purchase of the first product 1216a.

Referring to step 1005 of the method 1000 shown in FIG. 10A, a wallet application on the mobile device 1205 may generate transaction data for transferring an amount of cryptocurrency matching the sale price of the first product 1216a from the shopper to the merchant. The wallet application may generate a public key for the transaction using the private key of the shopper. In order to indicate that the shopper is the originator of the transaction, a digital signature may also be generated for the transaction using the private key of the shopper. The transaction data may be sent to the server 1250 from the mobile device 1205.

The server 1250 may receive the transaction data from the mobile device 1205. At step 1010, the server 1250 may broadcast the transaction to the blockchain network 130a. The transaction may be received by one or more nodes 205 of the blockchain network 130a. At step 1015, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 1020, each of the nodes 205 that selected the transaction may validate the transaction. At step 1025, if the transaction is successfully validated by a node 205, the validated transaction is added to a block being constructed by that node 205. At step 1035, the blockchain network 130a may wait for a block to be published. At step 1040, if a block has not been published, then the method 1000 returns to step 1035 and waits for a block to be published. However, at step 1040, if a block has been published, then the method 1000 proceeds to step 1045.

At step 1045, the published block is broadcast to the blockchain network 130a for validation. At step 1050, if the block is validated by a majority of the nodes 205, then at step 1055, the validated block is added to the blockchain 220. At step 1060, if the transaction was added to the blockchain 220, the server 1250 may wait to receive a minimum number of blockchain confirmations for the transaction. At step 1065, if the minimum number of confirmations for the transaction have not been received, then the process may return to step 1060. However, if at step 1065, the minimum number of confirmations have been received, then the process proceeds to step 1070. At step 1070, the transaction may be executed and the sale price of the first product 1216a may be transferred from the shopper to the merchant.

When the in-store smart checkout detector 1230 sends information about the products, such as the first product 1216a, and payment information from the mobile device 1205 to the merchant system 1210, a smart contract may be created between the shopper and the merchant and executed according to the method 1001 shown in FIG. 10B. For example, at step 1076, a smart contract between the shopper and the merchant may be created and then submitted to the blockchain network 130a as a transaction. For example, at step 1078, the method 1001 may wait to receive notification that an amount of cryptocurrency equal to the sale price of the first product 1216a was sent from a blockchain address associated with the shopper and was received at a blockchain address associated with the merchant by the time the first product 1216a is removed from the smart shopping cart 1235. If the payment for the first product 1216a was successfully transferred from the shopper to the merchant by the time the shopper removes the first product 1216a from the smart shopping cart 1235, then an electronic receipt may be generated and sent to the shopper. Otherwise, the merchant system 1210 may be alerted that the shopper is attempting to leave the premises without paying for the first product 1216a.

Blockchain Enabled In-Vehicle Purchasing

Figure 13:
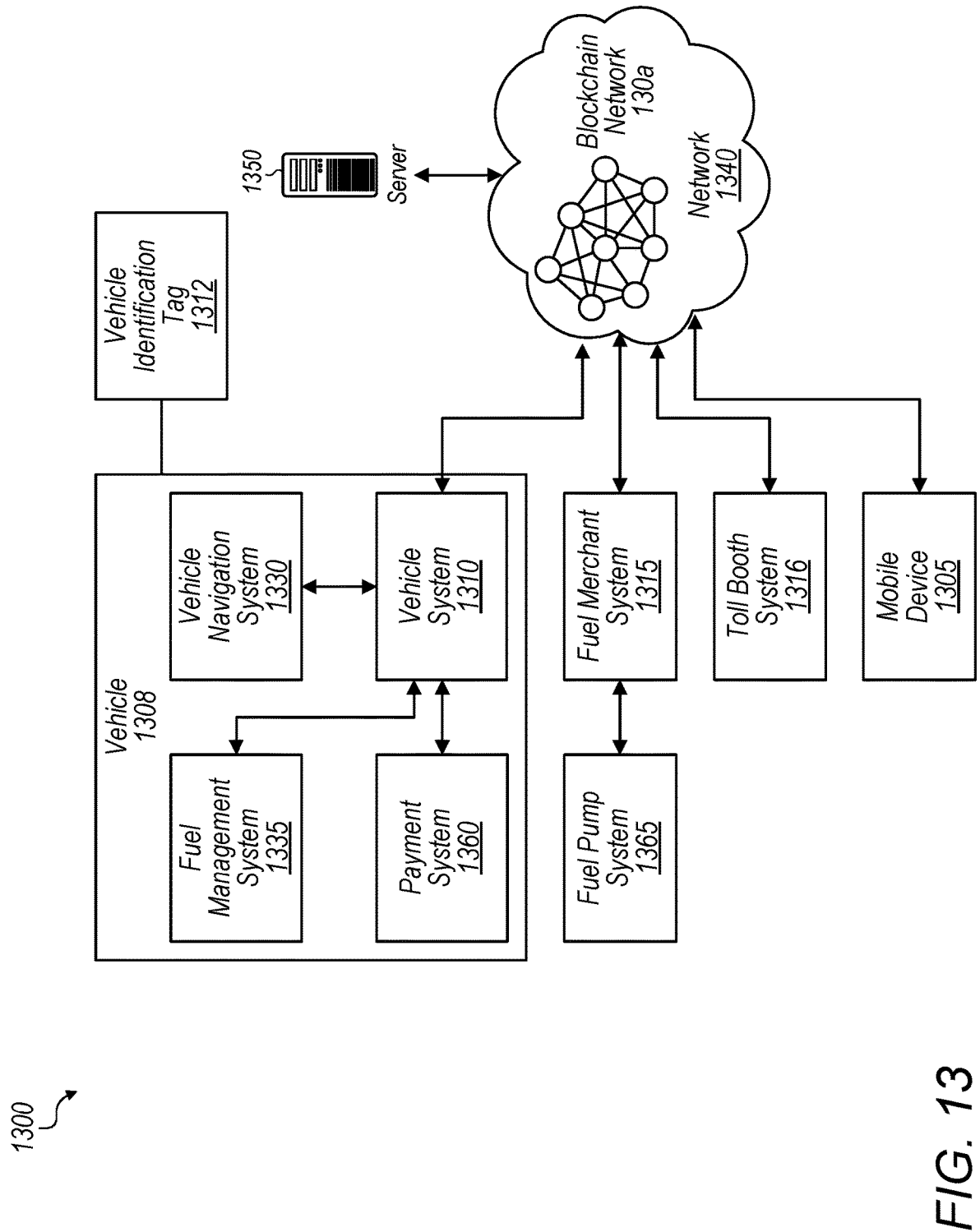
FIG. 13 illustrates an example of communications for an IoT blockchain enabled device system.

An example of blockchain enabled in-vehicle purchasing is described with reference to the system 1300 shown in FIG. 13, the method 1000 shown in FIG. 10A and the method 1001 shown in FIG. 10B. FIG. 13 illustrates an example system 1300 for blockchain enabled in-vehicle purchasing. The system 1300 includes an IoT enable smart vehicle 1308. The vehicle 1308 may include one or more computing devices implementing a vehicle system 1310, a vehicle navigation system 1330, a payment system 1360 and a fuel management system 1335. The vehicle 1308 may include a RFID tag, such as a vehicle identification tag 1312. The system 1300 may also include various merchant systems, such as a fuel merchant system 1315, and a toll booth system 1316. The system 1300 may also include a mobile device 1305 belonging to a driver of the vehicle 1308. Various components of system 1300 are configured to communicate over a network 1340 and interface with one or more blockchain networks (e.g., blockchain network 130a). In various embodiments, network 1340 includes the Internet.

When the driver gets into the vehicle 1308, payment information may be loaded from the driver's mobile device 1305 into the vehicle system 1310 so it is available for secure payments to other devices in order to complete in-vehicle purchases, such as in-vehicle purchase of fuel and in-vehicle payment of tolls. The driver of the smart vehicle may pay for parking, fast food, using the IoT enabled smart vehicle 1308. Additionally, the IoT enabled smart vehicle 1308 may also facilitate in-vehicle purchasing of smartphone apps, music, audio books, and other goods and services.

The fuel management system 1335 may perform various functions related to fuel usage and communicate with the vehicle system 1310. For example, the fuel management system 1335 may monitor fuel usage and based on detecting that the fuel is below a threshold, notify the vehicle system 1310. The vehicle system 1310 may communicate with the vehicle navigation system 1330 to determine nearby fuel stations. The selection of a fuel station to may be based on various factors, such as the availability of fuel at nearby fuel stations, the vehicle's current route and location, incentives that may be offered by nearby fuel stations, etc. The vehicle system 1310 may notify the driver about the selection of a fuel station and the vehicle 1308 may be re-routed to the selected fuel station. Upon arriving at the selected fuel station, the driver may pull up to a fuel pump. The fuel pump may include a fuel pump system 1365 configured to detect the RFID tags of vehicles, such as the vehicle identification tag 1312 in order to obtain an identification of the vehicles. The fuel pump system 1365 and the payment system 1360 may be configured to communicate with each other. The payment system 1360 may send payment information to the fuel pump system 1365. After the driver has completed re-fueling, the driver may simply drive away. The fuel pump system 1365 may send the fuel merchant system 1315 information about the identification of the vehicle 1308, the amount of fuel purchased, and the payment information. The fuel merchant system 1315 may use the information to complete a transaction with the driver for the purchase of the fuel. For example, the fuel merchant system 1315 may communicate with the server 1350 to charge the driver for the fuel according to the method 1000 shown in FIG. 10A. Additionally, the fuel merchant system 1315 may communicate with the server 1350 in order to create a smart contract between the driver and the fuel merchant. The smart contract may be created and executed according to the method 1001 shown in FIG. 10B.

Augmented Reality (AR), Mixed Reality and Blockchain Based E-Commerce

AR or mixed reality enabled devices, such as wearable smart glasses, head mounted devices, holographic devices, or smartphone applications overlay digital content on top of a real-world view, thus, enhancing a user's experience of the real world. The overlay content may be 3D models generated based on 3D scanning real world objects. AR enables users to experience online shopping in a virtual environment. For example, using AR, browse virtual stores and view 3D models of items for sale in virtual stores. Just as in the real world, customers may be able to handle and examine various physical details of the products. Blockchain smart contracts may be utilized to provide an e-commerce platform where customers may purchase items from online merchants with cryptocurrency and digital wallets. Information about a product, such as country of origin, materials, ingredients, price, description, measurements, terms and conditions, 3D model of the physical product, etc., may be hashed and recorded in a blockchain. This provides proof of ownership of virtual goods and products and enables accurate tracking of any changes made to this information. Artificial intelligence (AI) may be utilized for generating 3D models of products based on 2D images of the products. Smart contracts may be utilized to conduct transactions between merchants and customers.

As an example, a customer may shop for clothing by browsing different stores in a virtual shopping mall via a wearable AR device, such as a pair of smart glasses. The customer may examine a 3D model of a shirt as he or she would in the real world. Additionally, the customer may virtually try on the shirt using a 3D model of the customer's body. If the customer decides to purchase the shirt, the customer may initiate a transaction with the merchant of the store. A transaction may be submitted to the blockchain via the customer's digital wallet to transfer money (cryptocurrency) from the customer to the merchant. Various smart contracts may be utilized to implement various aspects of the e-commerce process. For example, based on detecting that the sale price of the shirt has been successfully transferred from the customer to the merchant, a smart contract may be executed to initiate shipment of the shirt from the merchant's warehouse to the customer. As described above with reference to supply chain monitoring and tracking, RFID tags and other IoT devices may be utilized to track the shipment of the shirt from the merchant's warehouse to the delivery of the shirt to the customer's residence.

Exemplary Computer System

Figure 14:
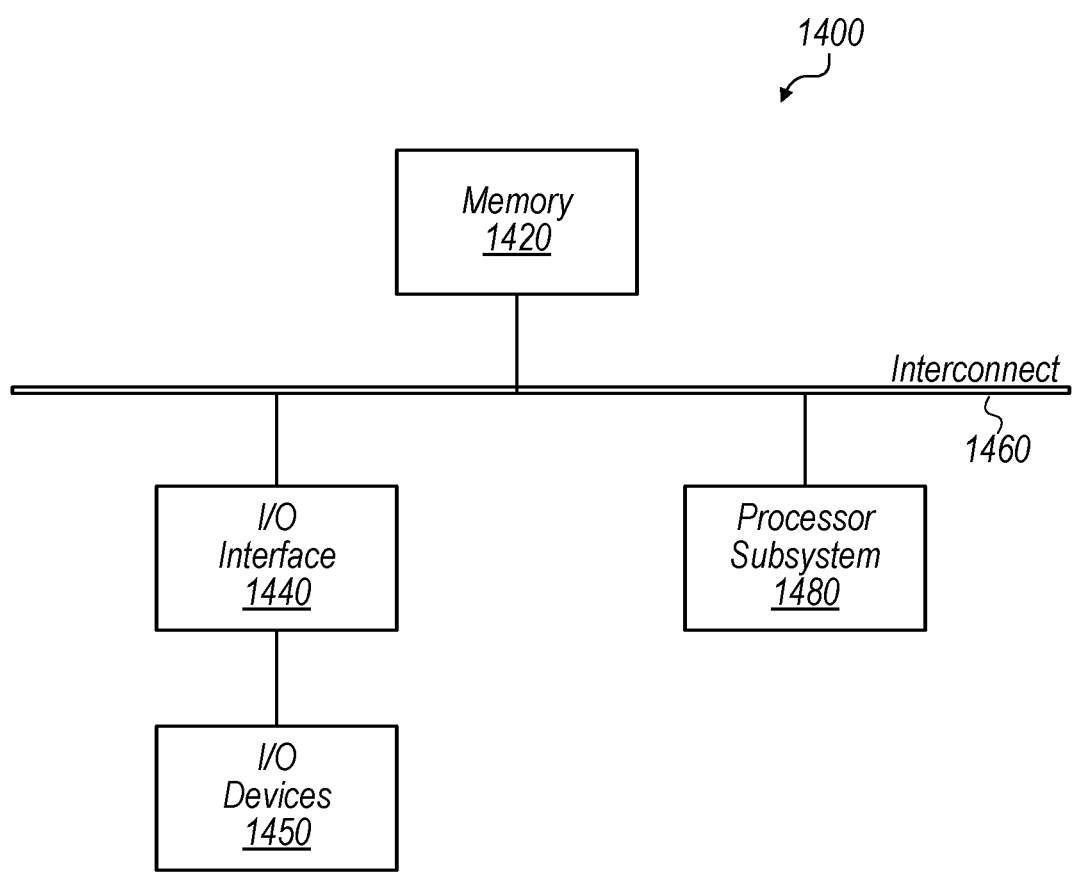
FIG. 14 is a block diagram of an exemplary computer system, which may implement the various components of FIG. 1.

Turning now to FIG. 14, a block diagram of an exemplary computing device 1400, which may implement the various components of system 100 (e.g., computer system 150, first internal client device 120, second internal client device 122) is depicted. Computing device 1400 includes a processor subsystem 1480 that is coupled to a system memory 1420 and I/O interfaces(s) 1440 via an interconnect 1460 (e.g., a system bus). I/O interface(s) 1440 is coupled to one or more I/O devices 1450. Computing device 1400 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computing device 1400 is shown in FIG. 14 for convenience, computing device 1400 may also be implemented as two or more computer systems operating together.

Processor subsystem 1480 may include one or more processors or processing units. In various embodiments of computing device 1400, multiple instances of processor subsystem 1480 may be coupled to interconnect 1460. In various embodiments, processor subsystem 1480 (or each processor unit within 1480) may contain a cache or other form of on-board memory.

System memory 1420 is usable to store program instructions executable by processor subsystem 1480 to cause computing device 1400 perform various operations described herein. System memory 1420 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computing device 1400 is not limited to primary storage such as memory 1420. Rather, computing device 1400 may also include other forms of storage such as cache memory in processor subsystem 1480 and secondary storage on I/O Devices 1450 (e.g., a hard drive, storage array, etc.). In some embodiments, these other forms of storage may also store program instructions executable by processor subsystem 1480.

I/O interfaces 1440 may be any of various types of interfaces configured to couple to and communicate with other devices, according to various embodiments. In one embodiment, I/O interface 1440 is a bridge chip (e.g., Southbridge) from a front-side to one or more back-side buses. I/O interfaces 1440 may be coupled to one or more I/O devices 1450 via one or more corresponding buses or other interfaces. Examples of I/O devices 1450 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computing device 1400 is coupled to a network via a network interface device (e.g., configured to communicate over WiFi, Bluetooth, Ethernet, etc.), another example of an I/O device 1450.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
    accessing, with a computer system for respective first and second internal user accounts of a transaction service provided by the computer system, first and second cryptographic key pairs, wherein the first and second cryptographic key pairs are useable to authenticate transactions for recordation on a blockchain;
    storing, at the computer system, private keys of the first and second cryptographic key pairs, wherein owners of the first and second internal user accounts cannot access the private keys;
    receiving, at the computer system, an indication of a first incoming transaction transferring a first digital asset from outside the transaction service to the first internal user account, wherein the blockchain includes a record of the first incoming transaction, wherein the indication of the first incoming transaction includes an indication of a public key of the first cryptographic key pair;
    in response to a request from the first internal user account, transferring, by the computer system in a first internal transaction, ownership of a portion of the first digital asset from the first internal user account to the second internal user account without performing a cryptographic operation using the private key of the first cryptographic key pair to cause recordation of the transfer on the blockchain, wherein an internal ledger of the transaction service includes a record of the transferring of the portion of the first digital asset; and
    causing presentation of user interfaces to the owners of the first and second internal user accounts, wherein when the blockchain indicates that the portion of the first digital asset belongs to the first internal user account, but the internal ledger indicates that the portion of the first digital asset belongs to the second internal user account:
        the user interface presented to the owner of the first internal user account indicates that the portion of the first digital asset does not belong to the first internal user account, and
        the user interface presented to the owner of the second internal user account indicates that the portion of the first digital asset belongs to the second internal user account.

2. The method of claim 1, wherein the request from the owner of the first internal user account includes a non-cryptographic account indicator of the second internal user account.

3. The method of claim 1, further comprising
    performing, with the computer system using the internal ledger, an outgoing transaction transferring one or more digital assets to a recipient external user account from an internal user account, wherein the computer system performs a cryptographic operation using a private key of a cryptographic key pair to cause recordation of the outgoing transaction on the blockchain.

4. The method of claim 1, further comprising:
    in response to a request from the second internal user account, sending, by the computer system using the internal ledger and the private key of the first cryptographic key pair, an indicator of an outgoing transaction transferring ownership of one or more digital assets from the second internal user account to a recipient external user account that is outside of the transaction service;
    wherein the indicator causes recordation of the outgoing transaction on the blockchain as an indicator of the first internal user account transferring the portion of the first digital asset directly to an indicator of the recipient external user account.

5. The method of claim 4, further comprising:
    receiving, at the computer system, an indication of a second incoming transaction transferring a second digital asset from outside the transaction service to the second internal user account, wherein the blockchain includes a record of the second incoming transaction, wherein the indication of the second incoming transaction includes an indication of a public key of the second cryptographic key pair; and
    wherein the computer system also uses the private key of the second cryptographic key pair while sending the indicator of the outgoing transaction; and
    wherein the indicator causes recordation of the outgoing transaction on the blockchain as:
        (a) the indicator of the first internal user account transferring the portion of the first digital asset to the indicator of the recipient external user account, and
        b) an indicator of the second internal user account transferring a portion of the second digital asset to the indicator of the recipient external user account.

6. The method of claim 1, further comprising:
    recording, with the computer system in the internal ledger and not on the blockchain, a plurality of subsequent internal transactions transferring digital assets between a set of internal user accounts of the transaction service including the first internal user account and the second internal user account; and
    sending, by the computer system using the internal ledger and a private key of a cryptographic key pair of a particular internal user account of the set of internal user accounts, an indicator of an outgoing transaction transferring ownership of one or more digital assets from the particular internal user account and to a recipient external user account that is outside of the transaction service, wherein the blockchain includes two blocks that collectively record the outgoing transaction.

7. The method of claim 6,
wherein the two blocks include:
- a first block indicative of a transfer of one or more digital assets to the particular internal user account from a first subset of the set of internal user accounts; and
- a second block indicative of a transfer of one or more digital assets to the recipient external user account from a second subset of the set of internal user accounts.

8. The method of claim 6, further comprising:
wherein the subsequent internal transactions do not include a transaction transferring digital assets from the second internal user account to the first internal user account; and
wherein the two blocks include a first block indicative of a transfer of digital assets from the second internal user account to the first internal user account.

9. A non-transitory, computer-readable medium storing instructions that when executed by a computer system cause the computer system to perform operations comprising:
- accessing, for respective ones of a plurality of internal user accounts of a transaction service, a plurality of respective cryptographic key pairs, wherein the cryptographic key pairs are useable to authenticate transactions for recordation on a blockchain;
- storing private keys of the cryptographic key pairs, wherein owners of the internal user accounts cannot access the private keys;
- receiving indications of a plurality of incoming transactions transferring respective digital assets from respective source external user accounts outside the transaction service to respective internal user accounts, wherein the blockchain includes records of the plurality of incoming transactions, wherein the indications of the plurality of incoming transactions include indications of one or more public keys of the cryptographic key pairs;
- in response to respective requests from respective ones of the internal user accounts, transferring, in respective internal transactions, ownership of digital assets between pairs of internal user accounts, wherein the blockchain does not include records of the internal transactions and wherein an internal ledger of the transaction service includes indications of the internal transactions; and
- causing presentation of user interfaces to the owners of the internal user accounts, wherein when the blockchain indicates that a particular digital asset belongs to a first internal user account, but the internal ledger indicates that the particular digital asset belongs to a second internal user account:
  - the user interface presented to the owner of the first internal user account indicates that the particular digital asset does not belong to the first internal user account, and
  - the user interface presented to the owner of the second internal user account indicates that the particular digital asset belongs to the second internal user account.

10. The non-transitory, computer-readable medium of claim 9, wherein incoming transactions to the transaction service and outgoing transactions from the transaction service use cryptographic identifiers whereas the internal transactions within the transaction service use non-cryptographic account indicators of the internal user accounts.

11. The non-transitory, computer-readable medium of claim 9, wherein a first internal transaction of the internal transactions transferred one or more digital assets from the first internal user account to the second internal user account, and wherein the operations further include:
- in response to a request from the second internal user account, sending using the internal ledger and the private key of the cryptographic key pair corresponding to the first internal user account, an indicator of an outgoing transaction transferring one or more digital assets to a recipient external user account from the first internal user account, wherein the blockchain includes one or more blocks that record the outgoing transaction.

12. The non-transitory, computer-readable medium of claim 11, wherein one of the one or more blocks indicates a transfer from the second internal user account to the recipient external user account.

13. The non-transitory, computer-readable medium of claim 11, wherein one of the one or more blocks indicates a transfer from the first internal user account to the second internal user account.

14. A method comprising:
- receiving, at a computer system providing a transaction service, indications of a plurality of incoming transactions transferring respective digital assets from respective source external user accounts outside the transaction service to respective internal user accounts, wherein a blockchain includes records of the incoming transactions, wherein the indications of the plurality of incoming transactions include indications of one or more public keys of cryptographic key pairs corresponding to respective internal user accounts of the transaction service;
- in response to respective requests from respective ones of the internal user accounts, transferring, with the computer system between pairs of internal user accounts in respective internal transactions, ownership of digital assets between the pairs of internal user accounts, wherein the blockchain does not include records of the internal transactions and wherein an internal ledger of the transaction service includes indications of the internal transactions;
- in response to a request from a particular internal user account, performing, with the computer system using the internal ledger, an outgoing transaction transferring one or more digital assets to a recipient external user account from one or more internal user accounts, wherein the blockchain includes a record of the outgoing transaction, and wherein owners of respective ones of the internal user accounts are only able to access the internal user accounts through the transaction service; and
- causing presentation of user interfaces to the owners of the internal user accounts, wherein when the blockchain indicates that a particular digital asset belongs to a first internal user account, but the internal ledger indicates that the particular digital asset belongs to a second internal user account:
  - the user interface presented to the owner of the first internal user account indicates that the particular digital asset does not belong to the first internal user account, and
  - the user interface presented to the owner of the second internal user account indicates that the particular digital asset belongs to the second internal user account.

15. The method of claim 14,
wherein a first internal transaction of internal transactions transferred one or more digital assets from a different internal user account to the particular internal user account;
wherein the outgoing transaction is performed using a private key of a cryptographic key pair corresponding to the different internal user account; and
wherein the blockchain includes a block that is indicative of the different internal user account transferring one or more digital assets to the recipient external user account.

16. The method of claim 14, wherein the digital assets are cryptocurrency.

17. The method of claim 16,
wherein as a result of the incoming transactions, balances of cryptocurrency corresponding to the internal user accounts are in a first state;
wherein as a result of the internal transactions, balances of cryptocurrency corresponding to the internal user accounts are in a different, second state according to the internal ledger but remain in the first state according to the blockchain; and
wherein as a result of the outgoing transaction, balances of cryptocurrency corresponding to at least some of the internal user accounts as indicated by the blockchain are updated to the second state by causing one or more blocks to be added to the blockchain.

\* \* \* \* \*

UNITED STATES PATENT AND TRADEMARK OFFICE
CERTIFICATE OF CORRECTION

| | |
|---|---|
| PATENT NO. | : 11,922,403 B2 |
| APPLICATION NO. | : 17/219450 |
| DATED | : March 5, 2024 |
| INVENTOR(S) | : Charles Gabriel Neale Dalton |

It is certified that error appears in the above-identified patent and that said Letters Patent is hereby corrected as shown below:

In the Claims

In Column 42 (Claim 4), Line 29, please delete "digital asset directly to an indicator" and insert -- digital asset to an indicator --.

Signed and Sealed this
Second Day of April, 2024

Katherine Kelly Vidal
*Director of the United States Patent and Trademark Office*